(12) United States Patent
Gray

(10) Patent No.: US 12,289,416 B1
(45) Date of Patent: Apr. 29, 2025

(54) INTERACTIVE ELECTRONIC SIGNATURE PLATFORM UTILIZING EMBEDDED PERSONALIZED MEDIA

(71) Applicant: RockStar idea, LLC, Phoenix, AZ (US)

(72) Inventor: Kevin Michael Gray, Phoenix, AZ (US)

(73) Assignee: RockStar idea, LLC, Phoenix, AZ (US)

( * ) Notice: Subject to any disclaimer, the term of this patent is extended or adjusted under 35 U.S.C. 154(b) by 0 days.

(21) Appl. No.: 18/900,562

(22) Filed: Sep. 27, 2024

(51) Int. Cl.
*H04L 9/40* (2022.01)
*H04L 9/32* (2006.01)

(52) U.S. Cl.
CPC .................. *H04L 9/3247* (2013.01)

(58) Field of Classification Search
CPC ..................................... H04L 9/3247
See application file for complete search history.

(56) References Cited

U.S. PATENT DOCUMENTS

| | | | | |
|---|---|---|---|---|
| 9,602,560 | B1* | 3/2017 | Moody | G06F 21/84 |
| 11,869,017 | B1* | 1/2024 | Gaeta | G06Q 50/18 |
| 2009/0249191 | A1* | 10/2009 | Leoutsarakos | G06Q 50/18 |
| | | | | 715/804 |
| 2011/0286584 | A1* | 11/2011 | Angel | H04M 3/42221 |
| | | | | 379/88.02 |
| 2015/0150141 | A1* | 5/2015 | Szymanski | G06F 21/64 |
| | | | | 726/26 |
| 2018/0205546 | A1* | 7/2018 | Haque | H04L 9/3213 |
| 2022/0337541 | A1* | 10/2022 | Rieseberg | H04L 63/104 |
| 2023/0247075 | A1* | 8/2023 | Ramoutar | H04L 65/75 |
| | | | | 348/14.08 |
| 2024/0289831 | A1* | 8/2024 | Grant | G06Q 30/0214 |
| 2024/0330829 | A1* | 10/2024 | Hatfield | G06Q 10/06393 |

* cited by examiner

*Primary Examiner* — Ghodrat Jamshidi

(57) ABSTRACT

Embedding personalized media into electronic document signing sessions in an electronic signature service includes receiving an electronic document, and media associated with the electronic document, from a document sender during generation of a signing package for a document signer to electronically sign. The electronic signature service embeds the media into the signing package with the electronic document and transmits notice of the signing package to the document signer. The media is displayed to the document signer at predetermined times respective to the commencement of an electronic signing session with the electronic signature service to electronically sign the electronic document.

20 Claims, 20 Drawing Sheets

INTERACTIVE ELECTRONIC SIGNATURE PLATFORM UTILIZING EMBEDDED PERSONALIZED MEDIA

BACKGROUND

The present invention relates in general to computing systems, and more particularly, to optimizing a user experience in an electronic signature workflow through use of interactive elements incorporated into an electronic signing session, by one or more computing processors.

SUMMARY

According to an embodiment, a computer-implemented method for embedding personalized media into an electronic document signing session in an electronic signature service is provided. In one embodiment, or more processors executing the electronic signature service receive an electronic document from a document sender. The one or more processors further receive one or more media portions associated with the electronic document from the document sender. The receiving from the document sender occurs during generation of a signing package for a document signer to electronically sign. The one or more processors executing the electronic signature service embed the one or more media portions into the signing package with the electronic document, and transmit notice of the signing package to the document signer. The one or more media portions are displayed to the document signer at predetermined times respective to the commencement of an electronic signing session with the electronic signature service to electronically sign the electronic document.

An embodiment includes a computer usable program product. The computer usable program product includes a computer-readable storage device, and program instructions stored on the storage device executable to perform similar functionality.

An embodiment includes a computer system. The computer system includes a processor, a computer-readable memory, and a computer-readable storage device, and program instructions stored on the storage device for execution by the processor via the memory to perform similar functionality.

BRIEF DESCRIPTION OF THE DRAWINGS

FIGS. 7A-7G are illustrations of an example user interface depicting document sender-facing functionalities in preparation for the electronic signing session, according to one or more implementations.

DETAILED DESCRIPTION OF THE DRAWINGS

Figure 1:
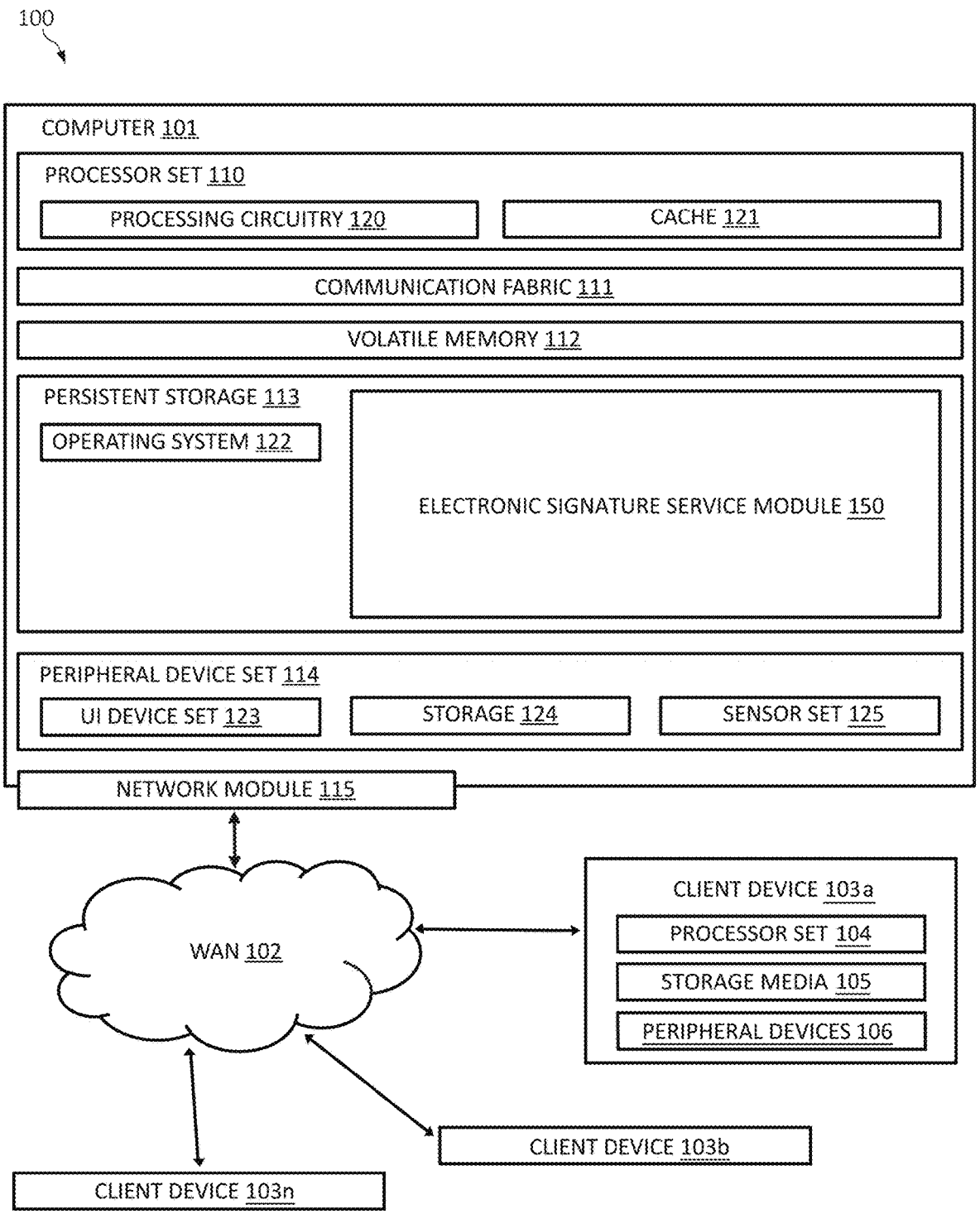
FIG. 1 is an illustration depicting a computing environment in which functions of the description may be performed.

Electronic signing (e-signing) platforms have become widely adopted for signing various types of documents and agreements. The range of applications for e-signing is vast, offering a convenient and time-saving alternative to traditional pen-and-paper signatures. Typically, these platforms enable a first party (i.e., a sender) to upload an electronic document to an electronic signature service, add text and/or signature fields to the electronic document, and send notice to a second party (i.e., a signer) that the electronic document is available for online signing through the electronic signature service. In other forms, the electronic document may be emailed from the first party to the second party for execution after using an application to sign the electronic document.

However, while effective in terms of functionality, many conventional e-signature platforms fall short in creating engaging, personalized experiences for users. They are often perceived as impersonal and purely transactional, missing an opportunity to foster deeper connections between businesses and their clients.

In today's highly competitive business landscape, creating memorable and engaging customer experiences is a key differentiator. The electronic document signing process, often one of the few direct touchpoints with clients, presents a significant opportunity to build trust, loyalty, and long-term relationships. Unfortunately, traditional e-signature solutions have not evolved to meet this need, remaining functional but lacking in personalization and interactivity.

The present invention introduces innovative elements to these platforms, such as personalized greeting videos, interactive conversational forms, and celebratory games and animations. These features turn the signing process into a memorable experience rather than just a task to be completed. For instance, personalized videos can welcome signers, provide instructions, or convey a warm message, creating a more engaging start to the process. Interactive forms replace static PDFs, guiding users smoothly and intuitively, which not only enhances the user experience but also increases completion rates. Custom branding options may be utilized to enhance brand identity, and celebratory animations and games at the end of the signing process increases the overall experience enjoyable, leaving a positive impression.

Various aspects of the present disclosure are described by narrative text, flowcharts, block diagrams of computer systems and/or block diagrams of the machine logic included in computer program product (CPP) embodiments. With respect to any flowcharts, depending upon the technology involved, the operations can be performed in a different order than what is shown in a given flowchart. For example, again depending upon the technology involved, two operations shown in successive flowchart blocks may be performed in reverse order, as a single integrated step, concurrently, or in a manner at least partially overlapping in time.

A computer program product embodiment ("CPP embodiment" or "CPP") is a term used in the present disclosure to describe any set of one, or more, storage media (also called "mediums") collectively included in a set of one, or more, storage devices that collectively include machine readable code corresponding to instructions and/or data for performing computer operations specified in a given CPP claim. A "storage device" is any tangible device that can retain and store instructions for use by a computer processor. Without limitation, the computer readable storage medium may be an electronic storage medium, a magnetic storage medium, an optical storage medium, an electromagnetic storage medium, a semiconductor storage medium, a mechanical storage medium, or any suitable combination of the foregoing.

Some known types of storage devices that include these mediums include: hard disk, random access memory (RAM), read-only memory (ROM), erasable programmable read-only memory (EPROM or Flash memory), static random access memory (SRAM), compact disc read-only memory (CD-ROM), digital versatile disk (DVD), memory stick, floppy disk, mechanically encoded device (such as punch cards or pits/lands formed in a major surface of a disc) or any suitable combination of the foregoing. A computer readable storage medium, as that term is used in the present disclosure, is not to be construed as storage in the form of transitory signals per se, such as radio waves or other freely propagating electromagnetic waves, electromagnetic waves propagating through a waveguide, light pulses passing through a fiber optic cable, electrical signals communicated through a wire, and/or other transmission media.

Computing environment 100 contains an example of an environment for the execution of at least some of the computer code involved in performing the inventive methods, such as electronic signature service module 150. In addition to block 150, computing environment 100 includes, for example, computer 101, wide area network (WAN) 102, and a client device 103*a* (and at least a client device 103*b* and/or client device 103*n*). In this embodiment, computer 101 includes processor set 110 (including processing circuitry 120 and cache 121), communication fabric 111, volatile memory 112, persistent storage 113 (including operating system 122 and block 150, as identified above), peripheral device set 114 (including user interface (UI) device set 123, storage 124, and sensor set 125), and network module 115.

COMPUTER 101 may take the form of a desktop computer, laptop computer, tablet computer, smart phone, smart watch or other wearable computer, server, mainframe computer, quantum computer or any other form of computer or mobile device now known or to be developed in the future that is capable of running a program, accessing a network or querying a database (not depicted). As is well understood in the art of computer technology, and depending upon the technology, performance of a computer-implemented method may be distributed among multiple computers and/or between multiple locations. On the other hand, in this presentation of computing environment 100, detailed discussion is focused on a single computer, specifically computer 101, to keep the presentation as simple as possible. Computer 101 may be located in a cloud, even though it is not shown in a cloud in FIG. 1. On the other hand, computer 101 is not required to be in a cloud except to any extent as may be affirmatively indicated.

PROCESSOR SET 110 includes one, or more, computer processors of any type now known or to be developed in the future. Processing circuitry 120 may be distributed over multiple packages, for example, multiple, coordinated integrated circuit chips. Processing circuitry 120 may implement multiple processor threads and/or multiple processor cores. Cache 121 is memory that is located in the processor chip package(s) and is typically used for data or code that should be available for rapid access by the threads or cores running on processor set 110. Cache memories are typically organized into multiple levels depending upon relative proximity to the processing circuitry. Alternatively, some, or all, of the cache for the processor set may be located "off chip." In some computing environments, processor set 110 may be designed for working with qubits and performing quantum computing.

Computer readable program instructions are typically loaded onto computer 101 to cause a series of operational steps to be performed by processor set 110 of computer 101 and thereby effect a computer-implemented method, such that the instructions thus executed will instantiate the methods specified in flowcharts and/or narrative descriptions of computer-implemented methods included in this document (collectively referred to as "the inventive methods"). These computer readable program instructions are stored in various types of computer readable storage media, such as cache 121 and the other storage media discussed below. The program instructions, and associated data, are accessed by processor set 110 to control and direct performance of the inventive methods. In computing environment 100, at least some of the instructions for performing the inventive methods may be stored in block 150 in persistent storage 113.

COMMUNICATION FABRIC 111 is the signal conduction path that allows the various components of computer 101 to communicate with each other. Typically, this fabric is made of switches and electrically conductive paths, such as the switches and electrically conductive paths that make up buses, bridges, physical input/output ports and the like. Other types of signal communication paths may be used, such as fiber optic communication paths and/or wireless communication paths.

VOLATILE MEMORY 112 is any type of volatile memory now known or to be developed in the future. Examples include dynamic type random access memory (RAM) or static type RAM. Typically, volatile memory 112 is characterized by random access, but this is not required unless affirmatively indicated. In computer 101, the volatile memory 112 is located in a single package and is internal to computer 101, but, alternatively or additionally, the volatile memory may be distributed over multiple packages and/or located externally with respect to computer 101.

PERSISTENT STORAGE 113 is any form of non-volatile storage for computers that is now known or to be developed in the future. The non-volatility of this storage means that the stored data is maintained regardless of whether power is being supplied to computer 101 and/or directly to persistent storage 113. Persistent storage 113 may be a read only memory (ROM), but typically at least a portion of the persistent storage allows writing of data, deletion of data and re-writing of data. Some familiar forms of persistent storage include magnetic disks and solid state storage devices. Operating system 122 may take several forms, such as various known proprietary operating systems or open source Portable Operating System Interface-type operating systems that employ a kernel. The code included in block 150 typically includes at least some of the computer code involved in performing the inventive methods.

For example, computer 101, via the electronic signature service module 150, may provide electronic signature services to facilitate execution of an electronic document and support activities to organize, facilitate, and execute or enable execution of an electronic signing workflow. The electronic signature services may comprise a cloud-based, enterprise-class signature service that replaces paper and ink signature processes with fully automated electronic signature workflows, thereby enabling users to easily send, sign, track, and manage signature processes using an application, such as a browser, or a mobile device. In the illustrated embodiments, electronic signature service module 150 manages the process, including transmitting documents, facilitating the input and collection of document information, guiding signatures or approvals after verification of collected information, generating notifications, and storing signed documents, including audit and certification information, in a secure environment.

PERIPHERAL DEVICE SET 114 includes the set of peripheral devices of computer 101. Data communication connections between the peripheral devices and the other components of computer 101 may be implemented in various ways, such as Bluetooth connections, Near-Field Communication (NFC) connections, connections made by cables (such as universal serial bus (USB) type cables), insertion-type connections (for example, secure digital (SD) card), connections made through local area communication networks and even connections made through wide area networks such as the internet. In various embodiments, UI device set 123 may include components such as a display screen, speaker, microphone, wearable devices (such as goggles and smart watches), keyboard, mouse, printer, touchpad, game controllers, and haptic devices. Storage 124 is external storage, such as an external hard drive, or insertable storage, such as an SD card. Storage 124 may be persistent and/or volatile. In some embodiments, storage 124 may take the form of a quantum computing storage device for storing data in the form of qubits. In embodiments where computer 101 is required to have a large amount of storage (for example, where computer 101 locally stores and manages a large database) then this storage may be provided by peripheral storage devices designed for storing very large amounts of data, such as a storage area network (SAN) that is shared by multiple, geographically distributed computers. Sensor set 125 may be made up of sensor devices which facilitate or aid the services provided by block 150.

NETWORK MODULE 115 is the collection of computer software, hardware, and firmware that allows computer 101 to communicate with other computers through WAN 102. Network module 115 may include hardware, such as modems or Wi-Fi signal transceivers, software for packetizing and/or de-packetizing data for communication network transmission, and/or web browser software for communicating data over the internet. In some embodiments, network control functions and network forwarding functions of network module 115 are performed on the same physical hardware device. Computer readable program instructions for performing the inventive methods can typically be downloaded to computer 101 from an external computer or external storage device through a network adapter card or network interface included in network module 115.

WAN 102 is any wide area network (for example, the internet) capable of communicating computer data over non-local distances by any technology for communicating computer data, now known or to be developed in the future. In some embodiments, the WAN 102 may be replaced and/or supplemented by local area networks (LANs) designed to communicate data between devices located in a local area, such as a Wi-Fi network. The WAN and/or LANs typically include computer hardware such as copper transmission cables, optical transmission fibers, wireless transmission, routers, firewalls, switches, gateway computers and edge servers.

CLIENT DEVICE 103, 103*a*, and/or 103*b* is any computer system that is used and controlled by an end user (for example, a customer of an corporation implementing the services of an enterprise controlling computer 101), and may take any of the forms discussed above in connection with computer 101. Client device 103*a* may be associated with a document sender that wishes to have an electronic document executed. Client device 103*b* and/or client device 103*n* may be associated with a document signer or third-party that is participating in the agreement defined by the electronic document. Client devices 103*a-n* may each also include an electronic signing application.

The electronic signing application may comprise an application served to the client devices 103*a*, 103*b*, and/or 103*n* by computer 101 via WAN 102 (e.g., through a web browser or plug-in). In another example, the electronic signing application may be a standalone application dedicated specifically for electronic signing workflows, such as a native application. Alternately or additionally, the electronic signing application may be proprietary software executable by an application, such as the web browser, to permit secure communication between the electronic signing application and a hosted service, such as one hosted online by the electronic signature service provider.

Client device 103*a*, 103*b*, and/or 103*n* may include some or all of the components of computer 101, and may be configured as a desktop computer, a laptop computer, a mobile device (e.g., assuming a handheld configuration such as a tablet or mobile phone), a tablet, and so forth. For example, client device 103*a*, 103*b*, and/or 103*n* may include a processing set 104 that may include one or more processing devices, one or more computer-readable storage media 105, and various peripheral devices 106, such as an image capture device, to implement corresponding functionality described herein.

In some embodiments, the image capture device of the client devices 103*a*, 103*b*, and/or 103*n* may comprise an integrated and/or standalone camera/microphone capable of video recording. Various types of input devices and input instrumentalities can be used to provide input to client devices 103*a*, 103*b*, and/or 103*n*. For example, the computing device can recognize input as being a mouse input, stylus input, touch input, input provided through a natural user interface, and the like. Thus, the computing device can recognize multiple types of gestures including touch gestures and gestures provided through a natural user interface.

As described, client devices 103*a-n* may be associated with various document senders and/or document signers. For example, client device 103*a* may be associated with a document sender that wishes to have an electronic document executed, and client device 103*b* may be associated with a document signer or third-party that is participating in the agreement defined by the electronic document, or vice versa.

Conversational Forms

Figure 2:
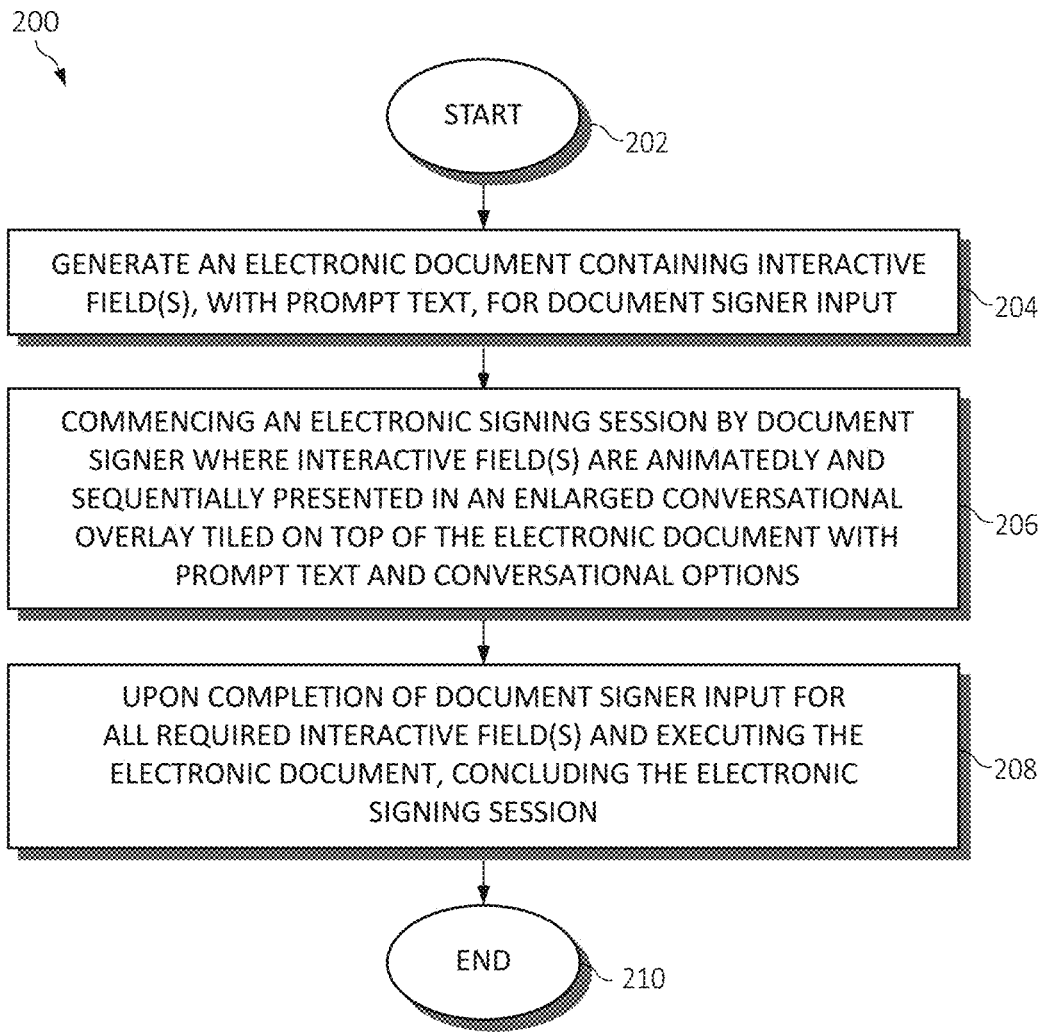
FIG. 2 is a flow diagram depicting a computer-implemented method of utilizing interactive conversational forms in an electronic signing session, according to one or more implementations.

Turning now to FIG. 2, a flow diagram of a computer-implemented method 200 for utilizing interactive conversational forms in an electronic signing session is depicted, as executed in accordance with the computing environment of FIG. 1.

Beginning at step 202, one or more processors, of processor set 110 executing an electronic signature service, generate an electronic document containing one or more interactive fields added to the electronic document by a document sender to receive input from a document signer. Each of the one or more interactive fields is associated with a prompt text, being separate to a placeholder text within the one or more interactive fields, added by the document sender to instructively direct the document signer with respect the input (step 204).

The one or more processors commence an electronic signing session initiated by the document signer. The document signer is sequentially and animatedly presented each of the one or more interactive fields respectively in a conversational overlay tiled on top of the electronic document. Each conversational overlay dynamically appears in a foreground above the electronic document, inclusive of the prompt text from the document sender and an enlarged view of a respective one of the one or more interactive fields associated with the prompt text (step 206).

Upon the document signer completing providing the input of each of the one or more interactive fields and executing the electronic document, the electronic signing session is concluded by the one or more processors (step 208). The computer-implemented method 200 ends at step 210.

Figure 3:
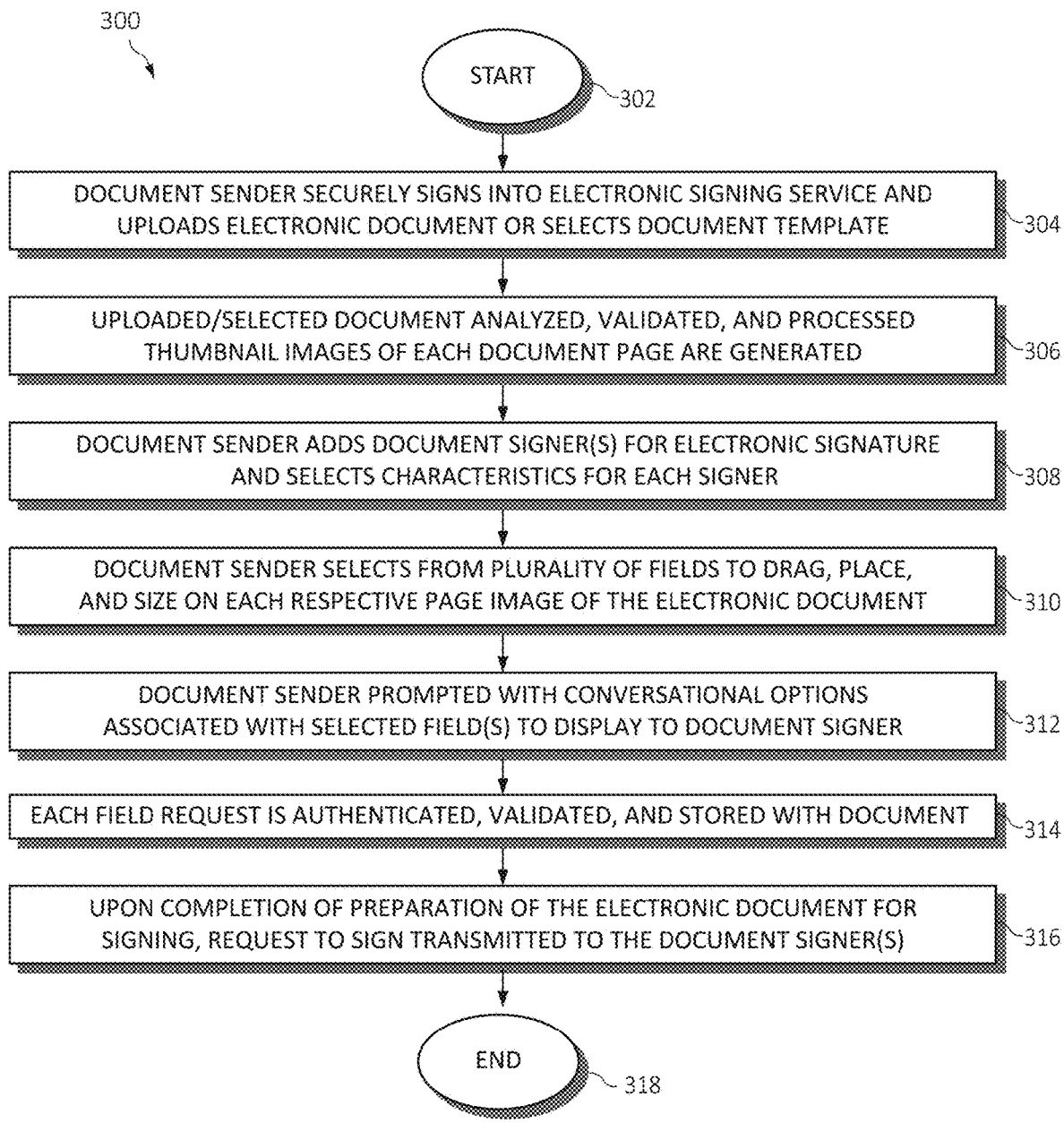
FIG. 3 is a flow diagram depicting a computer-implemented method of preparing interactive conversational forms to be utilized in the electronic signing session, according to one or more implementations.

Referring now to FIG. 3, document sender-facing operations as part of a flow diagram of a computer-implemented method 300 for utilizing interactive conversational forms in the electronic signing session are depicted. As illustrated, the steps of the computer-implemented method 300 are executed in accordance with the computing environment of FIG. 1, with references to the relationships of the process flow (i.e., of each of the method steps) utilizing the reference numbers identified on corresponding blocks of functionality illustrated in the interfaces depicted in FIGS. 7A-10.

The computer-implemented method 300 begins (step 302) with the document sender securely logging into the electronic document signature service. In one embodiment, this is performed by the document sender (i.e., a user) navigating a web browser of client device 103a to the electronic signature service's web address and entering therein user credentials of the sender. In another embodiment, the document sender may open and enter their credentials into a native application of the electronic signature service on the client device 103a. In handling these and other data requests, the electronic signature service may employ one or more security measures, including utilizing TLS encryption and/or asymmetrically encrypting communications between the service's application and API.

Following authentication, the document sender is presented an interface 700 (e.g., as depicted in FIGS. 7A-7F), which enables the document sender to upload an electronic document 714 or select a pre-existing template from the service or sending user's repository (step 304). Upon receiving (or retrieving) the electronic document 714, the electronic signature service processes the electronic document 714 by extracting content, analyzing the structure, and performing validation checks to ensure that the electronic document meets the required criteria (e.g., the electronic document 714 is in Portable Document Format (PDF)) for being handled by the service.

During this stage, the electronic signature service module 150 ensures the electronic document 714 adheres to format standards, and converts or "flattens" the electronic document 714 utilizing PDF Ghostscripts. This process, for example, absorbs any annotations within the electronic document 714, compresses the electronic document 714 into a compressed PDF, and normalizes the electronic document to a consistent and usable form. Processing of the electronic document 714 by the electronic signature service module 150 further logs the electronic document 714 into the system, including identifying a number of pages of the electronic document 714 and logging each page as an independent object in a database of the electronic signature service, and generates a thumbnail image of each page of the electronic document 714 in an image format (e.g., Joint Photographic Experts Group (JPEG), Portable Network Graphic (PNG), or the like). Once the processing of the electronic document 714 intake is complete, the electronic signature service's API returns a success code to the upload request with data the front end of the system uses to proceed (step 304).

The interface 700 of the system may then overlay an entry window 702 in which the document sender may utilize to input information of each intended document signer(s). The entry window 702 may include, for example, name and email information 704 of each signer, in addition to button selections to add a welcome video (button 706, discussed supra) or add a private message (button 708) to be displayed to the document signer during the electronic signing session. The document sender may define specific roles and signing privileges for each signer, which are then communicated to the electronic signature service module 150 to enforce these roles during the signing process. The document sender can set parameters such as the signing order, notification settings, and access permissions for each signer. The entry window 702 may also include an option to remove the respective signer (button 710) from the intended document signer(s) (step 306).

In step 308, the system presents the document sender the interface 700 displaying a main window tab 712 having certain options to navigate the system (e.g., electronic signature service settings and electronic document review tabs), an electronic document overview panel 718 depicting a layout of the electronic document 714, and other functionality such a record button 720 to enable the document sender to record a personalized video along with the electronic document 714 to the document signer.

The interface 700 further includes a selection of interactive fields 716 (i.e., form-fillable fields) that can be incorporated into the electronic document 714. The document sender interacts with the interface 700 to drag, place, and size selected fields from the interactive fields 716 on the electronic document's thumbnail images, ensuring accurate placement in relation to the electronic document's content. The interface 700 provides real-time feedback to the document sender, displaying a visual representation of how the document signer will interact with each field. This feedback is seamless to the document sender, as the electronic signature service does not rely on third-party packages nor native Hypertext Markup Language (HTML), e.g., HTML5, drag and drop functionality. Rather, the electronic signature service may employ customized dragging and resizing program code to further enhance the user experience.

The interactive fields 716 may include signature blocks, initial blocks, quick signature blocks, date fields, checkboxes (both single and multiple), dropdown boxes, radio buttons, and text input areas, among other elements, each tailored to capture the required information from the document signer. The document sender is prompted to configure these fields 716 based on the requirements for each intended document signer, which may include may involve specifying field attributes or properties such as data type, mandatory or optional status, and custom validations. The system dynamically updates the interface 700 in response to these selections, ensuring that the electronic document 714 fields are appropriately configured for the respective document signer's interaction (step 310).

In certain embodiments, some of these attributes associated with the interactive fields 716 may be referred to as "conversational options" or properties, which are configured by the document sender to be specific to a respective document signer. In other words, although the electronic document 714 may be sent to multiple document signers for execution, the conversational options presented to a first signer may be different than the conversational options presented to a second signer. Notably, the document sender can input "prompt text" 734 associated with each interactive field, which is text/content prominently displayed in proximity to (but not within) the interactive field to the document signer during the electronic signing session (step 312). This prompt text 734 is separate and independent of placeholder text 736 and/or a default value 738 displayed as a temporary marker within its associated interactive field prior to the document signer providing their own input during the electronic signing session.

The prompt text 734 transforms the signing process into a "conversational experience," serving as a personalized message from the document sender that guides the document signer through the document, making the process more intuitive and tailored to the individual recipient. That is, rather than merely displaying a static field label (e.g., "Signature") near each interactive field, the prompt text 734 can provide descriptive context or a pose a question to the document signer in relation to a respective interactive field, enhancing the document signer's understanding and interaction with the document and its content during the electronic signing session. This allows for the reuse of standardized forms while offering a highly customizable experience that speeds up the signing process and significantly improves the quality of the interaction.

For example, consider a scenario in which, as part of the signature process, the document sender desires that (at least one of) the document signer(s) provides a short review of a salesperson associated with a contract comprised of the electronic document 714. In this situation, the document sender may use interface 700 to drag, drop, and size a text entry field 732 onto the electronic document 714, where the document signer is to provide textual input during the electronic signing session. When configuring the properties of the text entry field 732, the document signer may add prompt text 734, inputting text (e.g., the question, "John, would you mind writing a short review of your experience with your salesperson?") to be displayed to the document signer outside of the boundaries of the text entry field 732. The document sender may also configure placeholder text 736 and/or a default value 738 (e.g., "Review goes here!"), which is displayed within the boundaries of the text entry field 732 to the document signer at signing.

In another example, consider the document sender adds a signature field 740 to the electronic document 714, but desires to add a personalized message specific to the signature field 740 (and the document signer) to create a positive experience during their signing. When configuring the properties of the signature field 740, the document signer may add prompt text 734, inputting text (e.g., "Thank you, John. Please sign below using a drawn signature, or you're welcome to type your name.") to be displayed to the document signer outside of the boundaries of the signature field 740. The document sender may also configure additional properties of the signature field 740 (e.g., whether a hand drawn signature is required, etc.) at the time of preparing the electronic document 714 for signature. As mentioned, additional conversational options will be discussed, following.

In certain embodiments, additional user-friendly tools may assist both the document sender and the document signer in preparation and completion of the electronic document 714. For example, consider the document sender desires to add one or more radio buttons or checkboxes 742 from the selection of interactive fields 716 to the electronic document 714 for the document signer to select one or more of during the electronic signing session. The interactive fields 716 may include options for the document sender to select single choice and/or multiple choice (i.e., allowing the document signer to select only one or multiple) fields to embed within the electronic document 714.

Upon the document sender selecting a radio button or checkbox field 742 option (e.g., a single choice parameter displaying multiple checkboxes that allow the document signer to select only a single checkbox thereof during signing), a scope crosshair indication representing the checkbox field 742 may be displayed on the interface 700 to the document sender. The scope crosshair may then be utilized by the document sender to select location(s) within the electronic document 714 to place, "stamp" or "shoot" one or more of the checkbox field(s) 742 with high precision and in an animated and/or gamified manner. Similarly, during the electronic signing session, when displaying the checkbox field(s) to the document signer, the scope crosshair may appear to aid the document signer in selecting the appropriate radio button(s) or checkbox(es) with ease, accuracy, and/or in a gamified manner. This technique may be found particularly advantageous when the document sender and/or the document signer prepares/signs the electronic document 714 on a mobile device (e.g., a cellular phone, tablet, or the like), where, for example, fingertip input is utilized on a display with limited real estate to provide input for the selection.

As each request to add one of the interactive fields 716 to the electronic document 714 is received by the system, the electronic signature service verifies the authenticity and integrity of each field request, cross-referencing them with stored field placement rules and security protocols defined in the service module (step 314). This validation process involves, for example, authenticating the call request as initiating from the package owner, and checking that all mandatory fields are correctly configured and that any signer-specific restrictions, such as sequential signing order, are adhered to. Further, valid width, height, and three-dimensional (x, y) coordinates of the interactive field with respect to the page image are confirmed, along with any data integrity requirements as required by the particular interactive field.

Once the electronic document 714 and all interactive fields are fully configured and validated, the electronic signature service module 150 generates a signing request and transmits it to the designated document signer(s) via a secure communication channel established over the WAN 102. The request contains a link or secure access pathway that enables the document signer to review and interact with the electronic document 714 on client device 103*b* (step 316). The computer-implemented method 300 ends at step 318.

Figure 4:
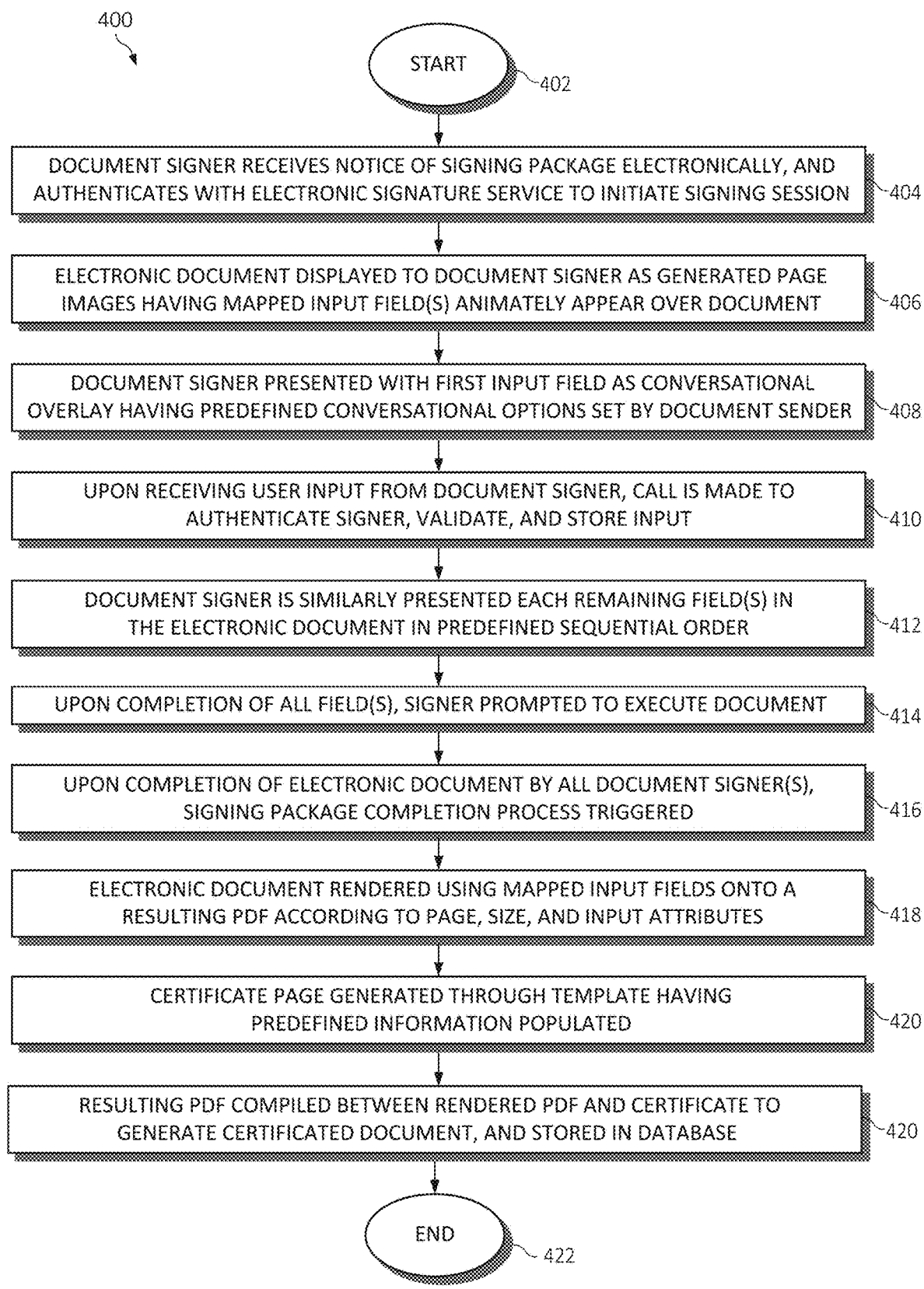
FIG. 4 is a flow diagram depicting a computer-implemented method of delivering interactive conversational forms utilized in the electronic signing session, according to one or more implementations.

Now referring to FIG. 4, document signer-facing operations as part of a flow diagram of a computer-implemented method 400 for utilizing interactive conversational forms in the electronic signing session are depicted. As illustrated, the steps of the computer-implemented method 400 are executed in accordance with the computing environment of FIG. 1, with references to the relationships of the process flow (i.e., of each of the method steps) utilizing the reference numbers identified on corresponding blocks of functionality illustrated in the interfaces depicted in FIGS. 7A-10.

The computer-implemented method 400 begins (step 402), with the document signer, utilizing client device 103b, receiving notice of the signing package through the WAN 102 (i.e., via email 800) and subsequently authenticating with the electronic signature service to initiate an electronic signing session of the electronic document 714 (step 404). Generally, upon transmitting the request to the computer 101 of the electronic signature service, the client device 103b reveals certain technical characteristics, such as what type of computer client device 103b comprises, when placing the request.

In cases where client device 103b comprises a traditional computer (i.e., desktop or laptop computer), the document signer may be presented with interface 900. If client device 103b is a mobile device (i.e., cellular phone, small tablet, etc.), interface 950 may be presented to the document signer. In some implementations, the interface 950, displayed on a mobile device, may comprise a condensed version of interface 900 with electronic document 714 primarily displayed and afforded a majority of the display space within the interface 950, while other menu options may be displayed less conspicuously or utilizing smaller representative icons.

Upon successful authentication, selected conversational options (e.g., a welcome video, discussed below) and the electronic document 714 are displayed to the document signer through interface 900 and/or 950 having an electronic document overview panel 906. The electronic document 714 is presented to the document signer in image format as page images, having the interactive fields dynamically mapped to appear on top of the page images as designated by the document sender (step 406).

In step 408, the document signer is presented with the first interactive field in what is referred to herein as a "conversational overlay" 908. This conversational overlay 908 animatedly enters the interface 900 and/or 950 and dynamically appears as an overlay (i.e., window) tiled atop the electronic document 714 so as to partially obscure the electronic document 714. In other words, the conversational overlay 908 appears in a foreground of the interface 900 and/or 950 while the electronic document 714 appears in a background of the interface 900 and/or 950 each time the document signer is presented with one of the interactive fields 716 to receive input. This conversational overlay 908 includes an enlarged depiction of the respective interactive field being presented to the document signer, any applicable prompt text 734 associated with the respective interactive field, the interactive field itself inclusive of any applicable placeholder text and/or default values within, and menu options to continue/go back in the electronic signing session workflow.

To wit, the conversational overlay 908 includes predefined conversational options that have been set by the document sender. These options are designed to guide the document signer through the signing process with context-specific prompts that enhance the overall user experience. For instance, if the interactive field corresponds to a text entry, the conversational overlay 908 might include a customized prompt text 734 such as "Hey Kevin, what is your favorite color?" to personalize the interaction while maintaining the electronic document 714's format and consistency, among the other provided examples.

Notably, the conversational overlay 908 is advantageous to both interface 900 (displayed on desktop or laptop computers) and interface 950 (displayed on mobile devices). For example, the conversational overlay 908, when displayed within interface 900, may break the uniformity experienced by the document signer when reviewing a potentially long and often times complicated legal document. Further, the conversational overlay 908 yields the additional benefit of enlarging specific portions of the document for which input is required, and provides an uncluttered and independent view (i.e., from the electronic document 714) with contextual instructions or directions via the prompt text 734 to aid the document signer with respect to the information being requested of each interactive field.

These features are particularly beneficial for document signers engaging in the electronic signing session via mobile devices having comparatively smaller displays than traditional computers. For example, a document signer engaging in the electronic signing session through interface 950 displayed on a mobile phone will find that the conversational overlay 908, through which input is requested for a particular interactive field, is far easier to engage with to review and understand which information the system is requesting the document signer input at the particular time of the session. Moreover, this provides clarity to document signers with respect to the information being requested and input into the interactive fields so as to mitigate any misunderstanding or input contextually incorrect information therein.

Upon receiving user input from the document signer, the system proceeds place a back-end call to authenticate the document signer's identity (step 410). The system also validates the input against the requirements of the respective interactive field, such as ensuring the correct data type or verifying that required fields are not left blank. Following successful validation, the input is saved by the electronic signature service as being associated with the electronic document 714.

The document signer is sequentially presented with the remaining interactive fields in a predefined order, as set by the document sender and/or the electronic signature service, continuing the guided interaction established in previous steps (step 412). This ordered presentation within the conversational overlay 908 reduces cognitive load and minimizes the risk of skipped fields, promoting a smoother and more efficient signing process.

Upon completing and validating all required fields, the document signer is prompted to execute the electronic document 714 (step 414). This execution typically involves the application of the document signer's electronic signature and adoption 912, and/or the selective input of an agreement statement 914 in conjunction with a signing button 916, which signifies agreement and authorization of the electronic document 714's contents.

Once the electronic signature service has received notification that the electronic document 714 has been executed by all designated document signers, the a signing package completion process is triggered (step 416). This step marks the transition from the interactive signing session to the generation of a finalized signed document.

The completion process renders each interactive field 716 from its respective page image onto the resulting PDF document according to its page, coordinates, size, and other input attributes, ensuring that the visual layout closely mirrors the original interactive session. The rendered document faithfully reproduces the completed fields as they appeared during the signing process, preserving the integrity and authenticity of the signed document.

At step 420, a certificate page is generated, which serves as an additional layer of verification for the completed document. The certificate page is created through a template, typically utilizing a Laravel Blade HTML template, which allows dynamic fields to be merged into a predefined structure. This certificate page includes pertinent details, such as timestamps, authentication logs, and the identities of the document signers, thus providing a comprehensive record of the electronic signing session.

This completed PDF is compiled alongside the certificate page to produce a certificated document (step 420). This compilation process integrates the rendered interactive fields and certificate page into a single cohesive document, which is then stored in the database of the electronic signature service for future reference. A reference to the stored document is maintained, allowing authenticated users to access and download the certificated document when necessary. The computer-implemented method 400 ends (step 422).

Embedding Personalized Media

General Agreements

In some embodiments, the conversational options selectable by the document sender include the option to embed personalized media into the electronic signing session (and notice thereof) for presentation to the document signer. This media can be placed selectively by the document sender at any point within the document, allowing the sender to decide when and where the media is displayed during the signing session. For example, the media could appear alongside specific clauses or line items to provide contextual information, ensuring the signer receives guidance exactly when it's needed.

Figure 5:
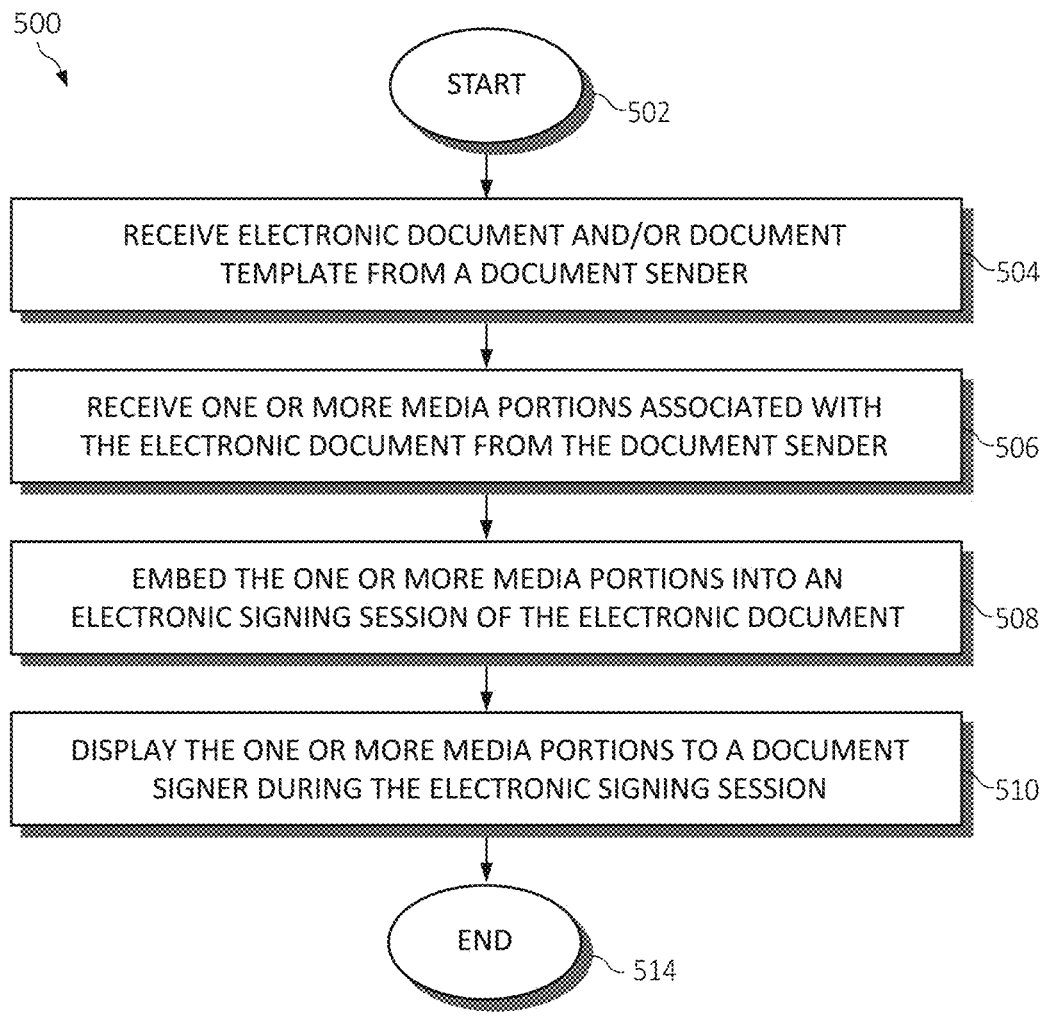
FIG. 5 is a flow diagram depicting a computer-implemented method for embedding personalized media into the electronic signing session, according to one or more implementations.

Turning now to FIG. 5, a flow diagram of a computer-implemented method 500 for embedding personalized media into the electronic signing session in the electronic signature service is depicted, as executed in accordance with the computing environment of FIG. 1.

Beginning at step 502, one or more processors, of processor set 110 executing an electronic signature service, receive an electronic document from a document sender (step 504). The one or more processors further receive one or more media portions associated with the electronic document from the document sender (step 506). The one or more processors embed the one or more media portions into a signing package to be displayed to a document signer during the electronic signing session of the electronic document (step 508), and display the one or more media portions to the document signer in the electronic signing session during which the document signer electronically signs the electronic document (step 510). This media can be configured to appear at specific points of interaction within the document to enhance understanding or guide the signer, such as when particular fields or sections require attention. The computer-implemented method ends (step 514).

Figure 6:
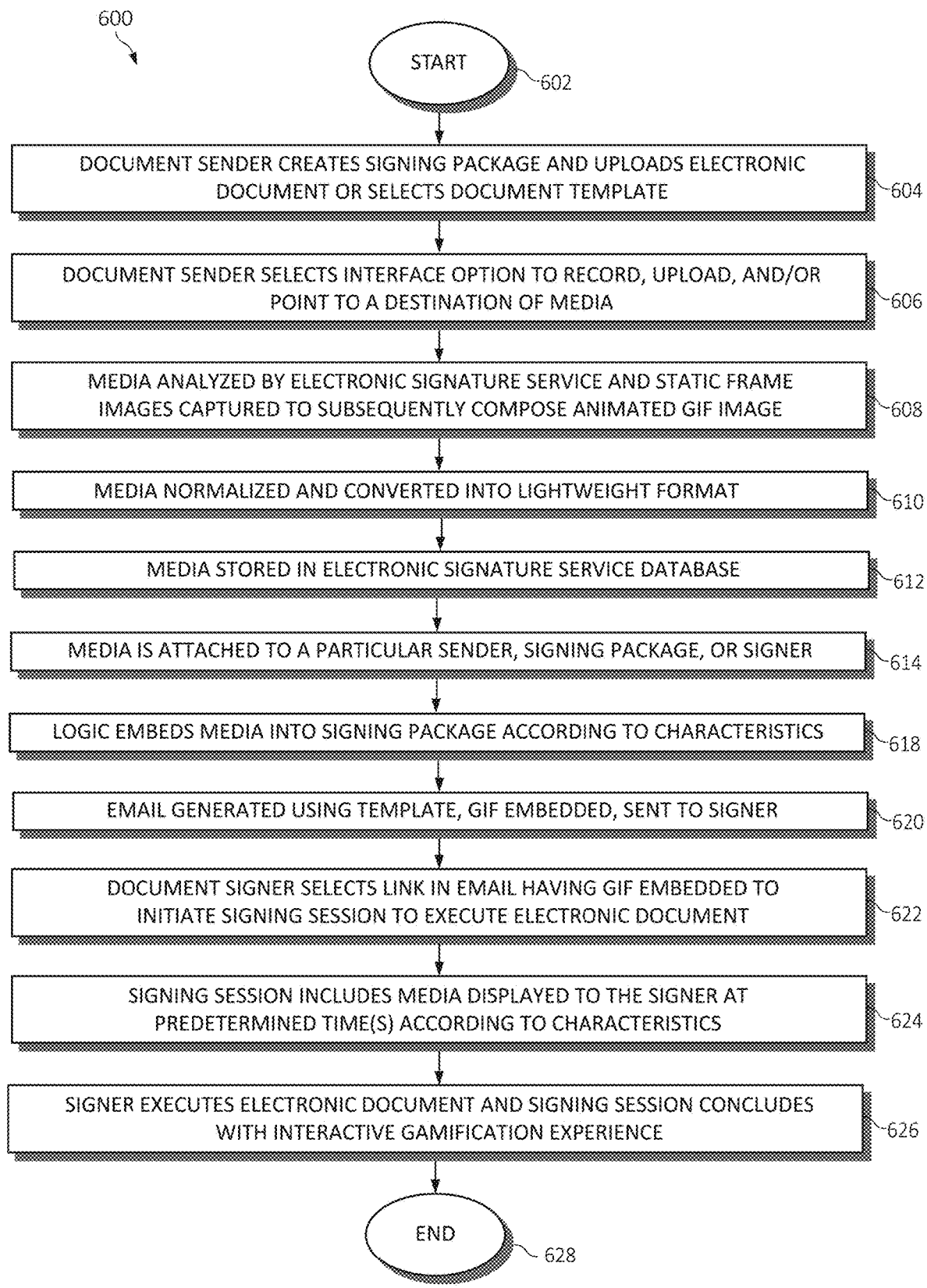
FIG. 6 is an additional flow diagram depicting a computer-implemented method for embedding personalized media into the electronic signing session, according to one or more implementations.
Figure 7A:
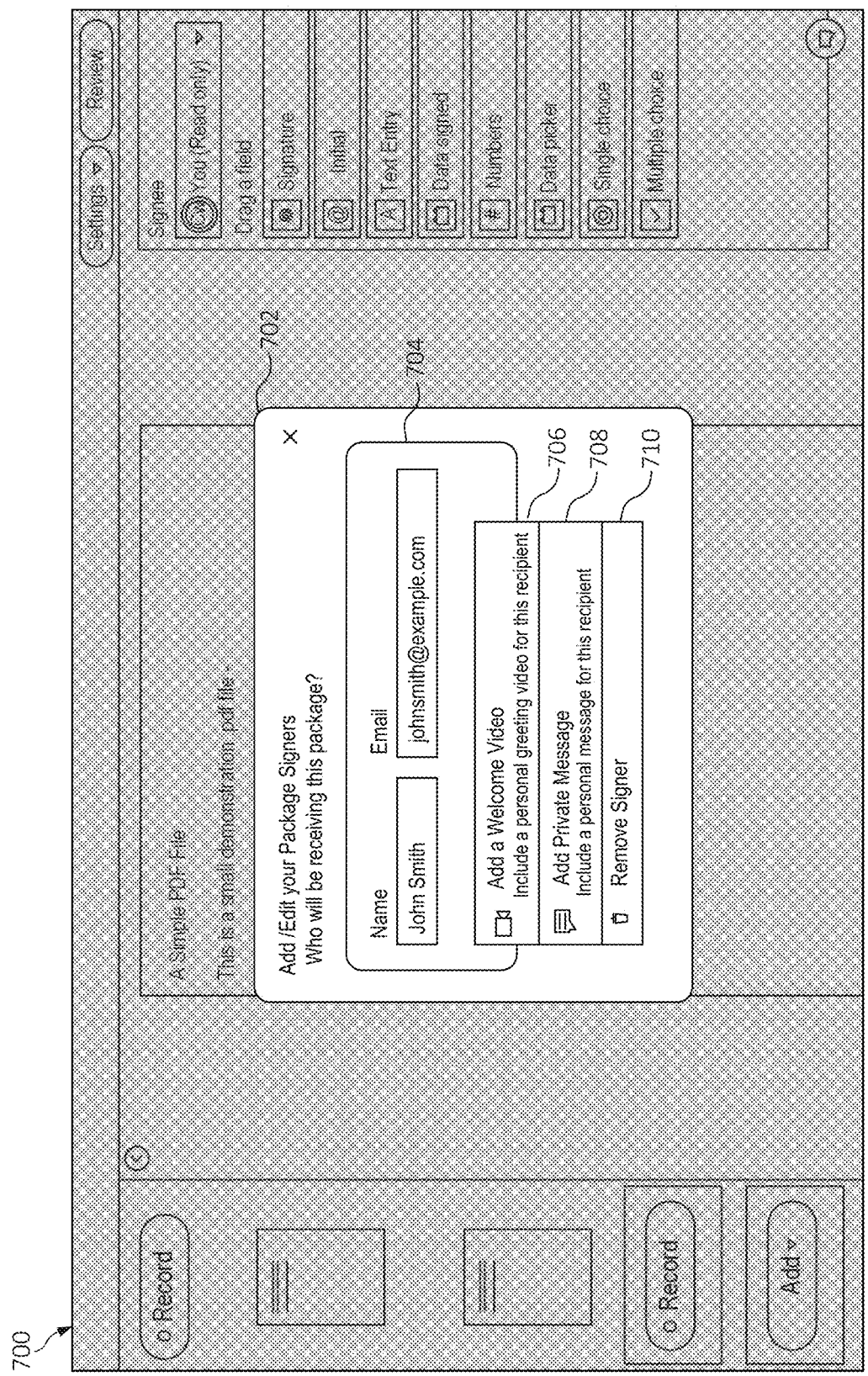
Figure 7B:
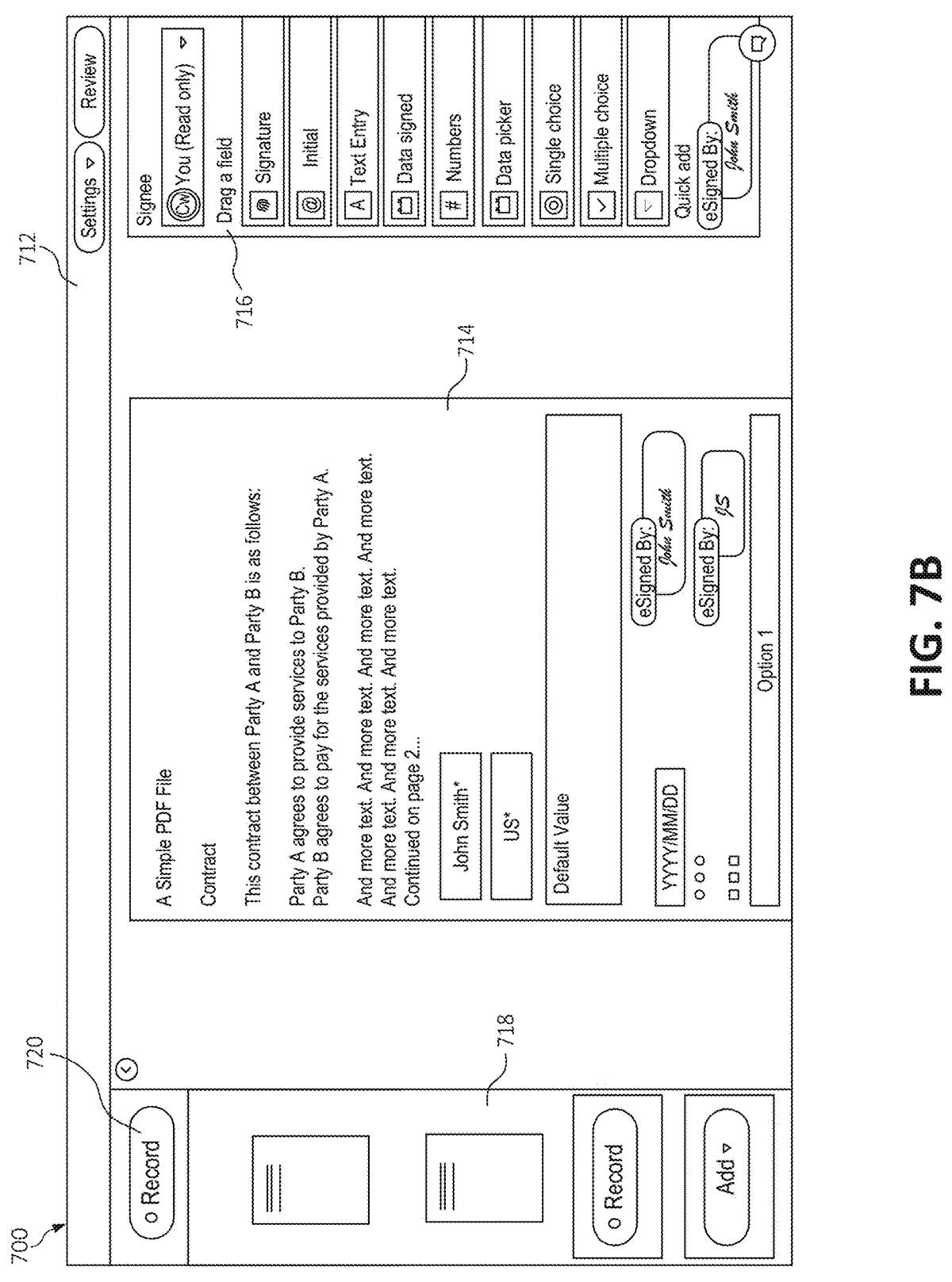
Figure 7C:
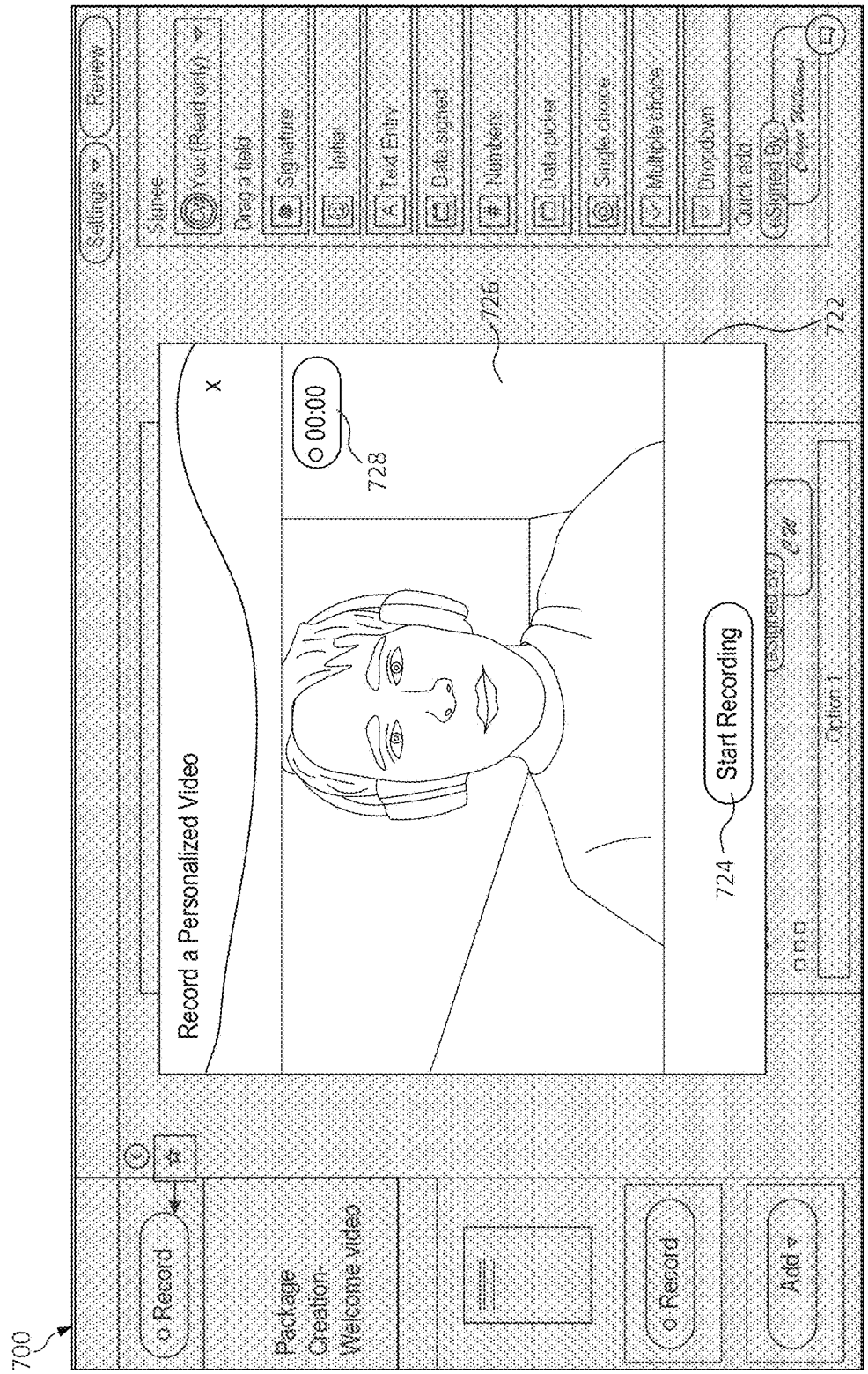
Figure 7D:
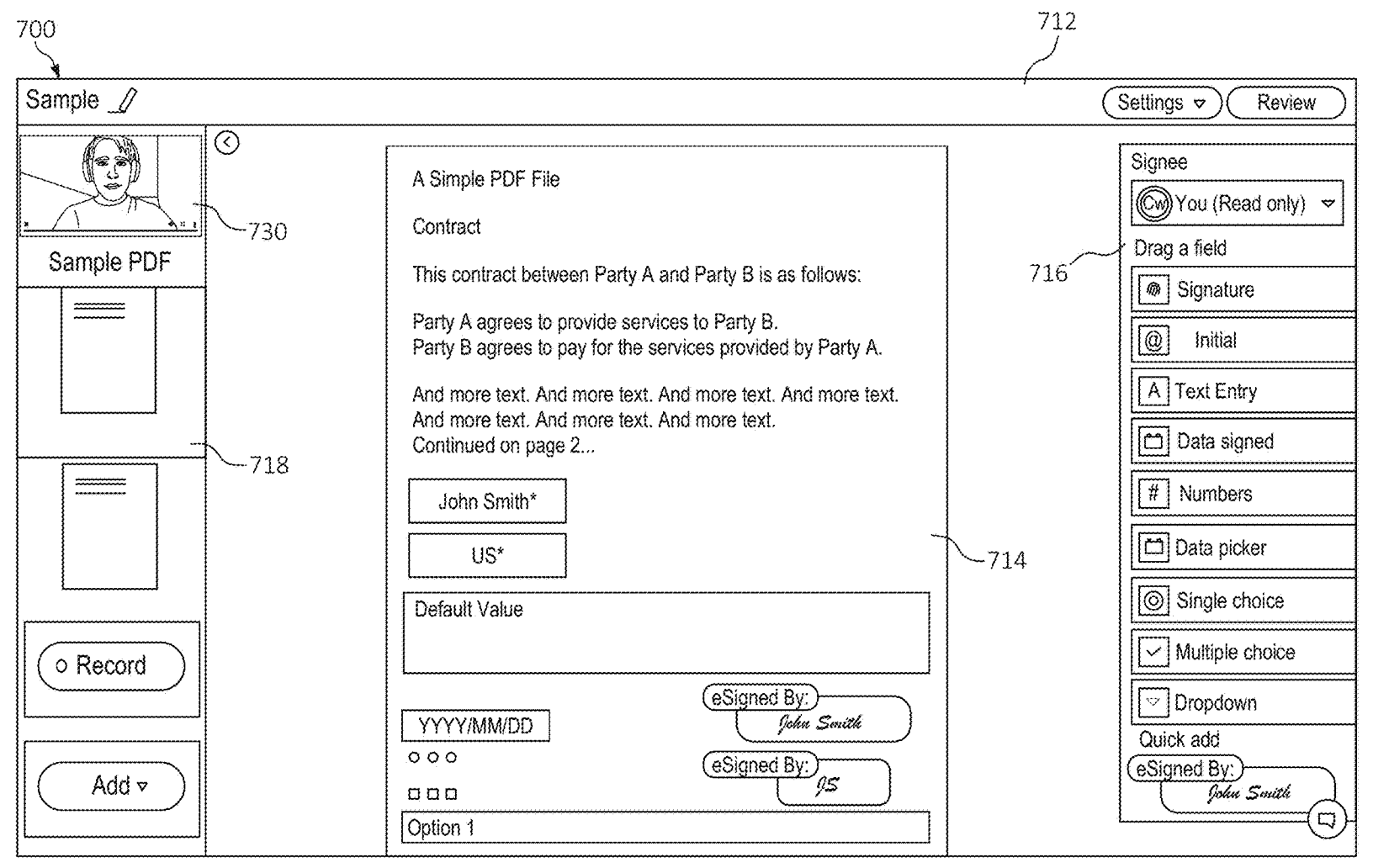
Figure 7E:
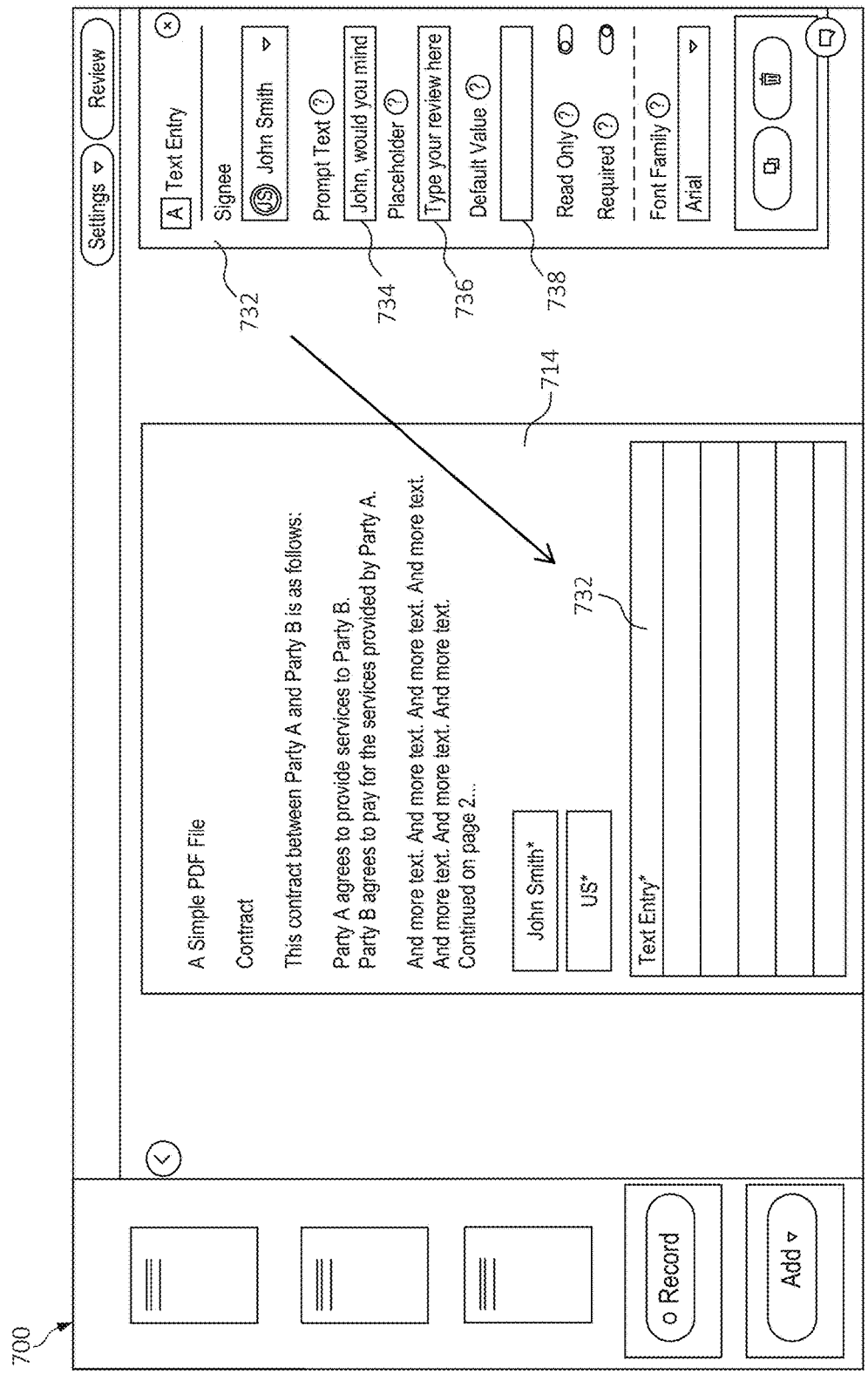
Figure 7F:
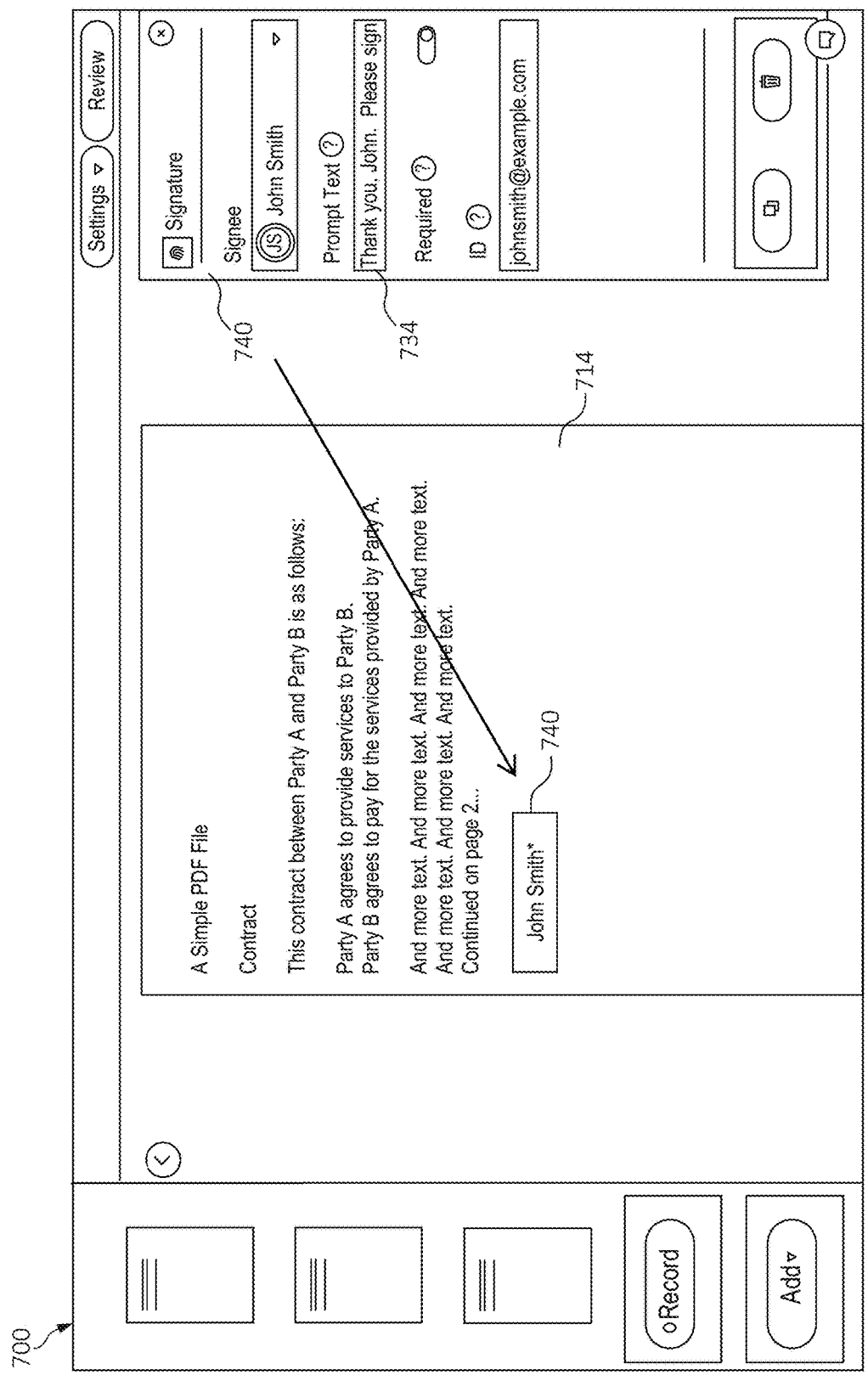
Figure 7G:
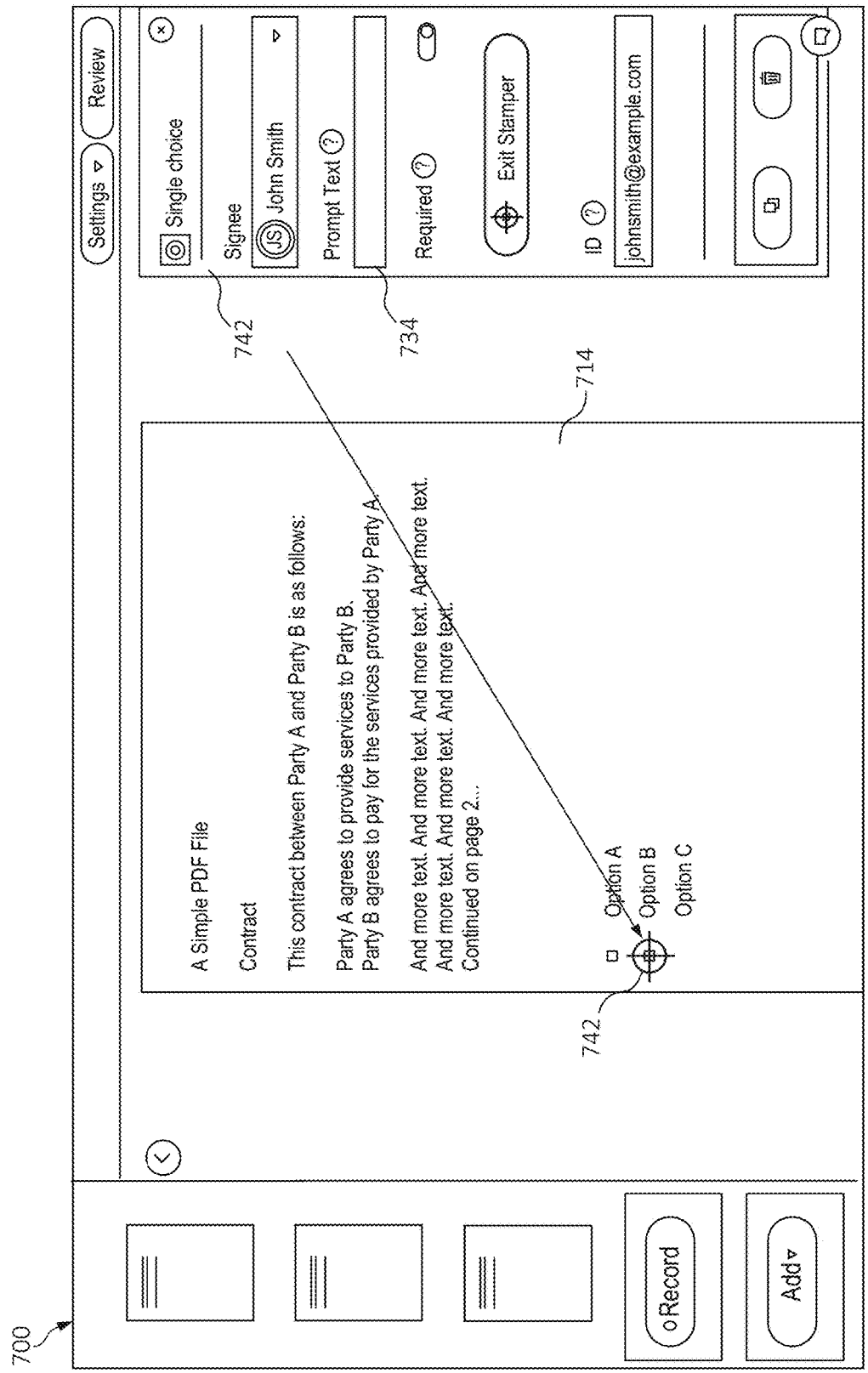
Figure 8:
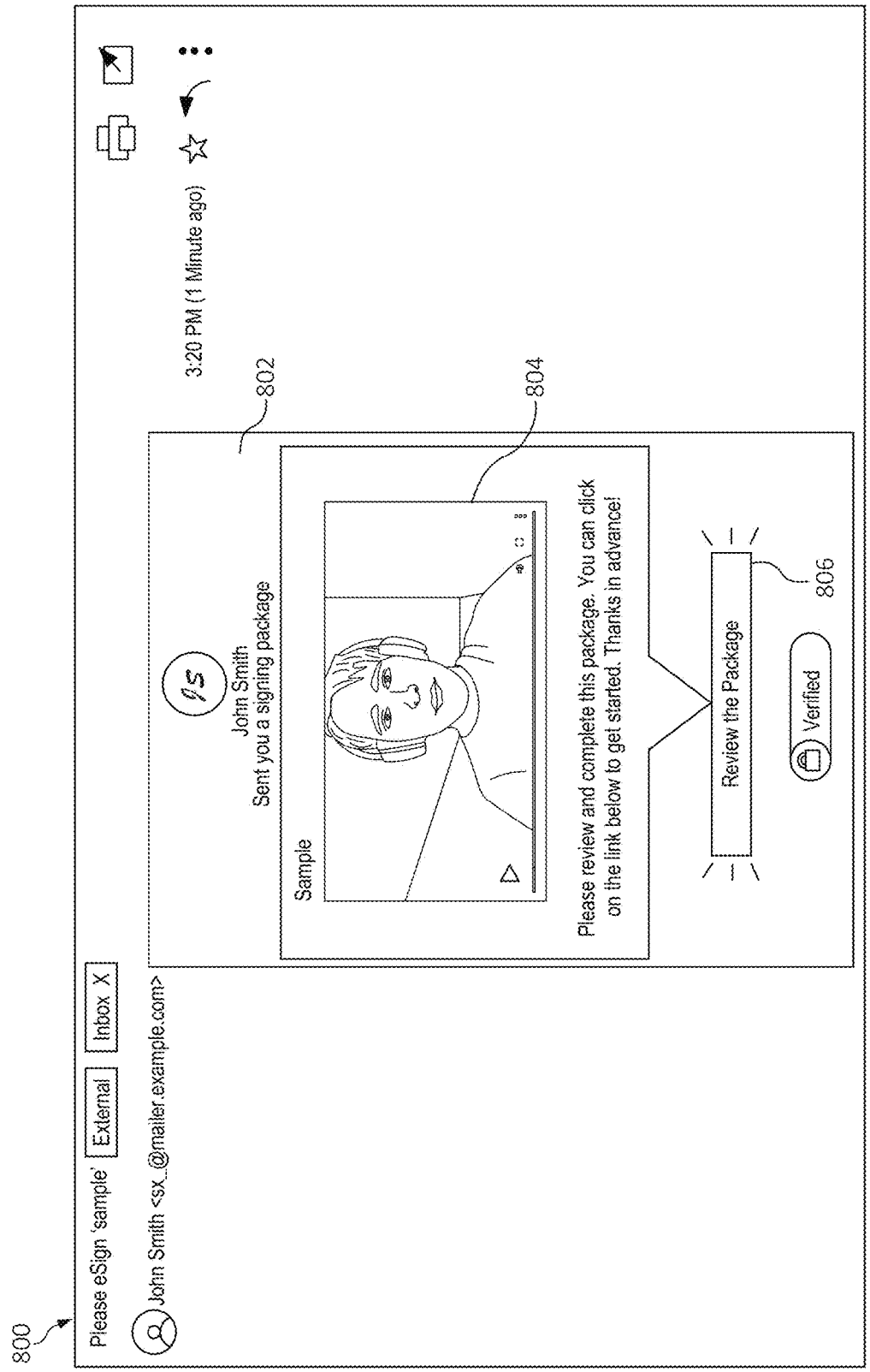
FIG. 8 is an illustration of an example invitation to participate in the electronic signing session, according to one or more implementations.
Figure 9A:
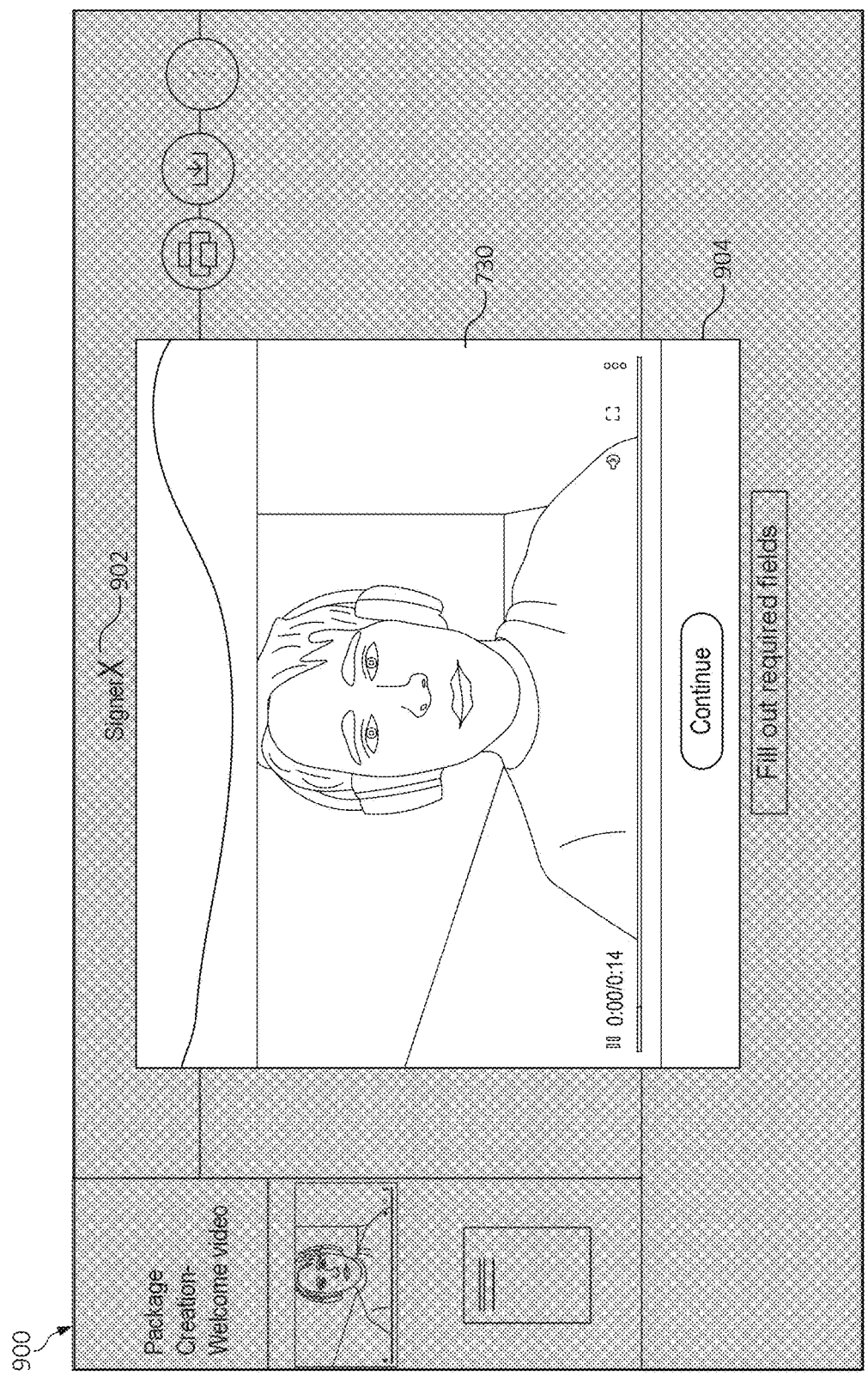
FIGS. 9A-9E are illustrations of an example user interface depicting document signer-facing functionalities during the electronic signing session, according to one or more implementations.
Figure 9B:
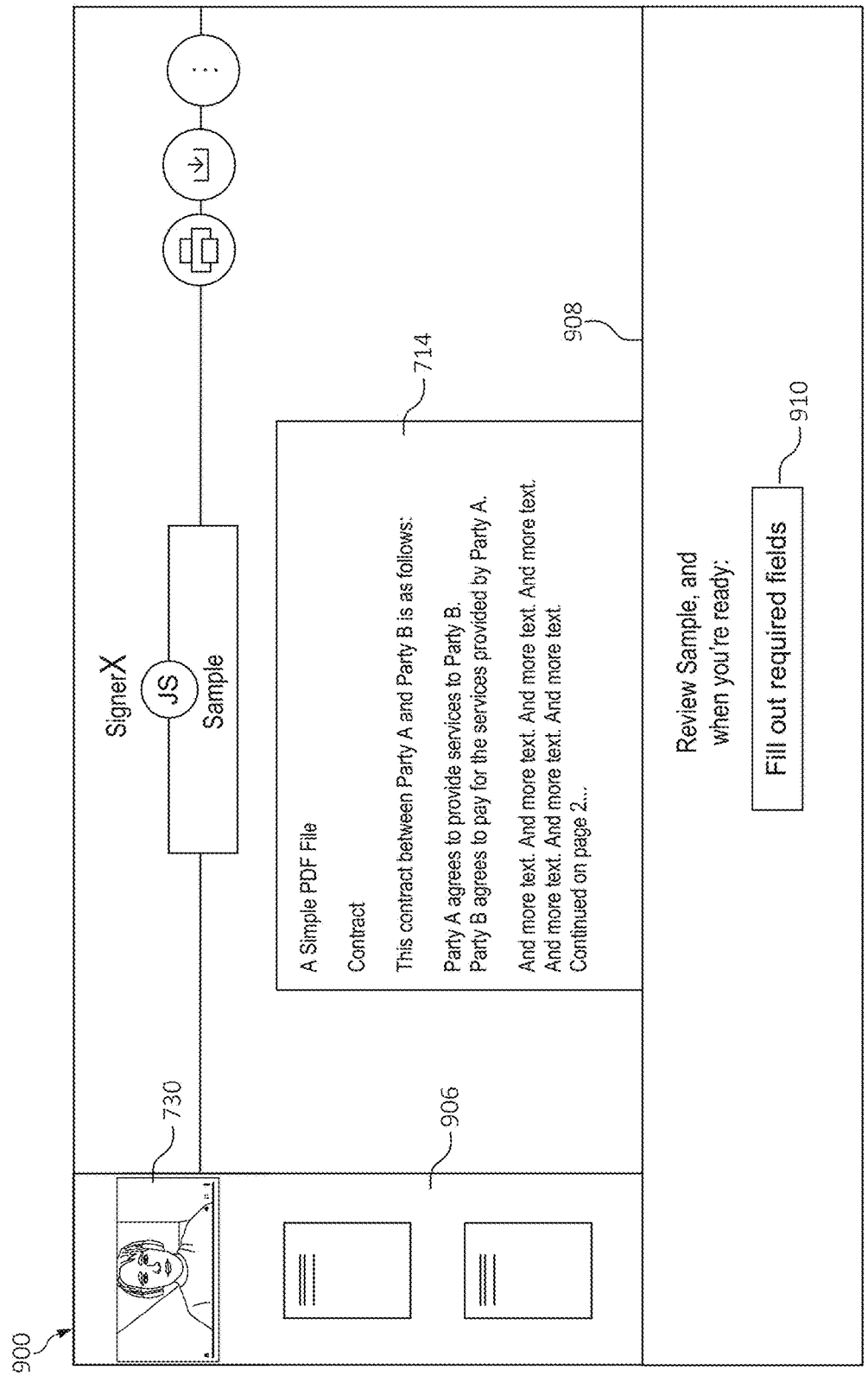
Figure 9C:
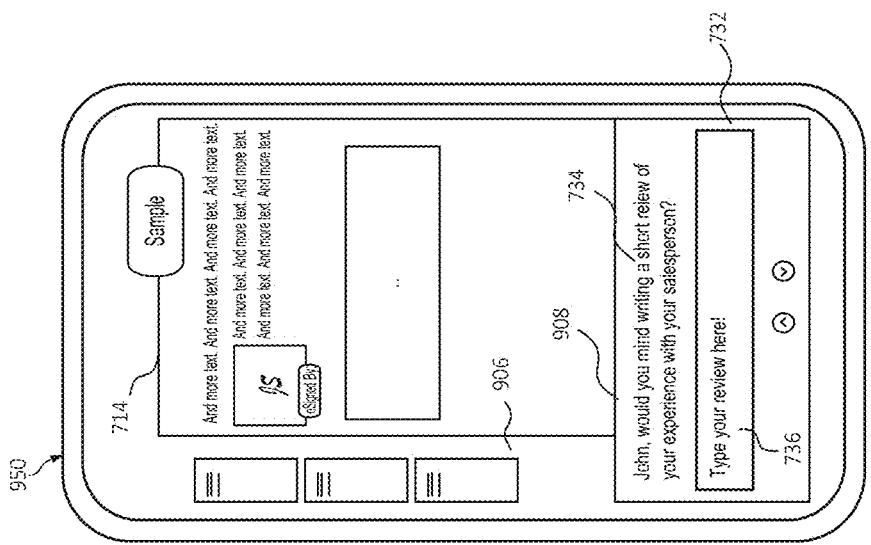
Figure 9C:
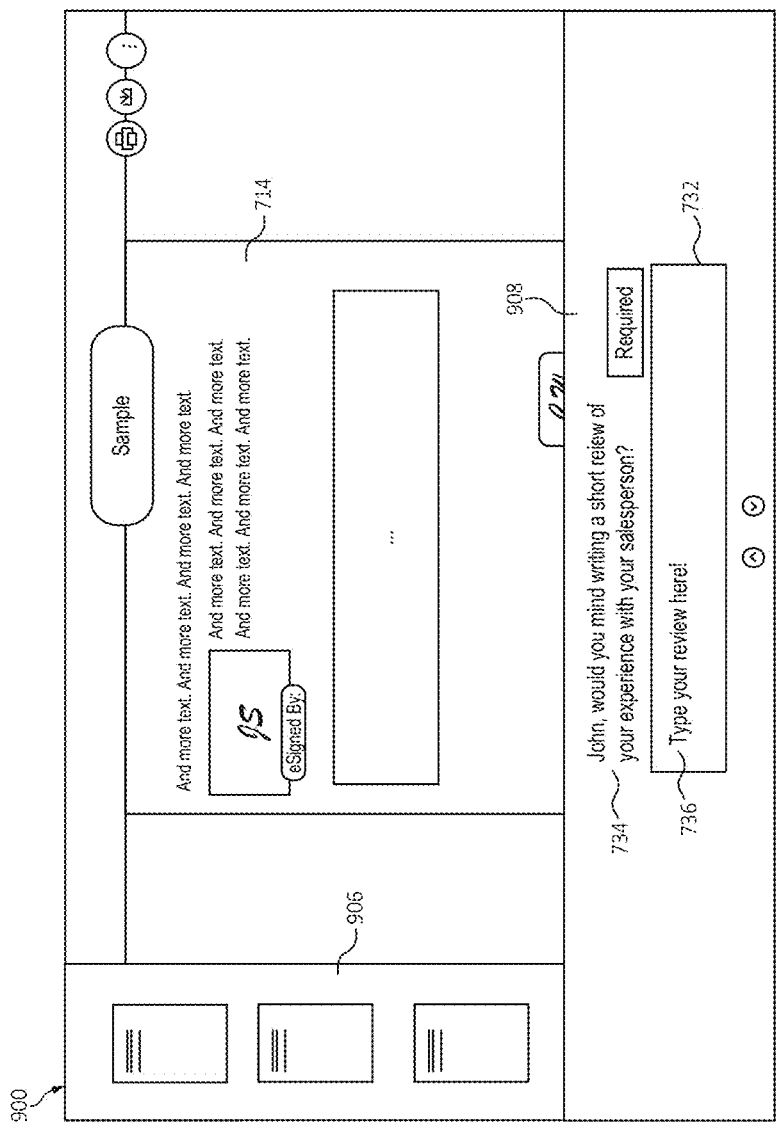
Figure 9D:
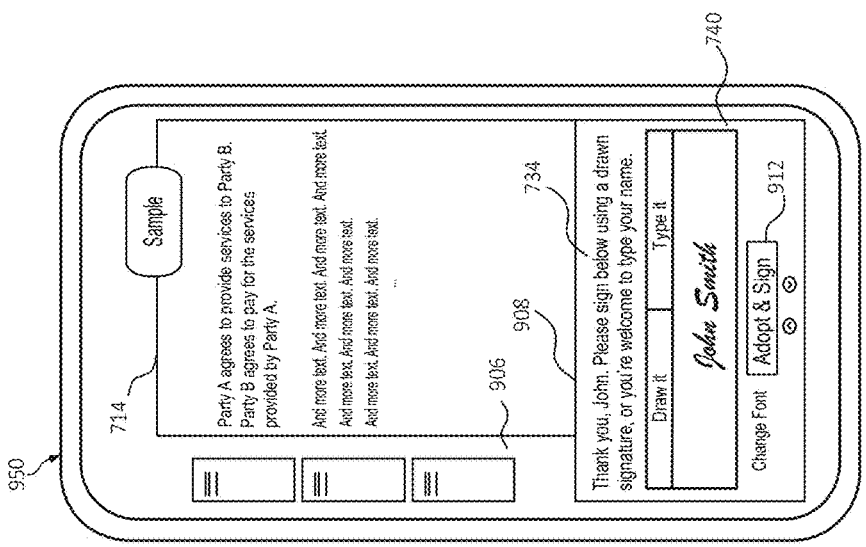
Figure 9D:
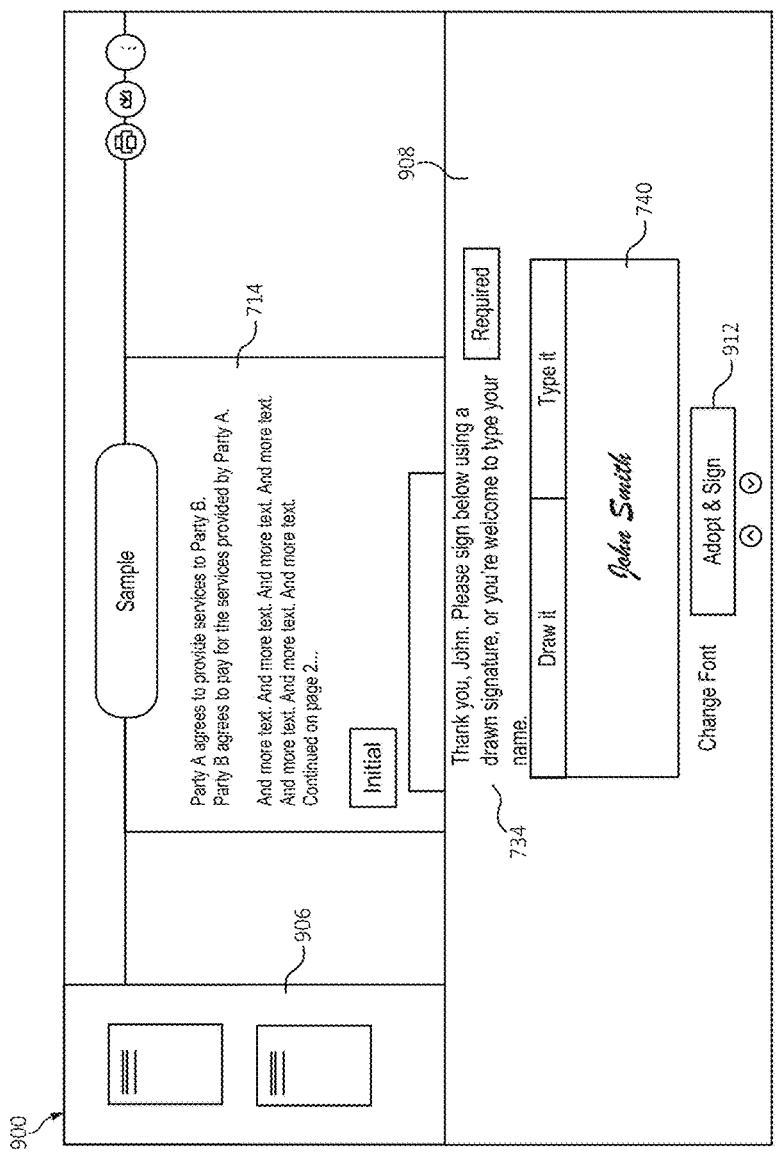
Figure 9E:
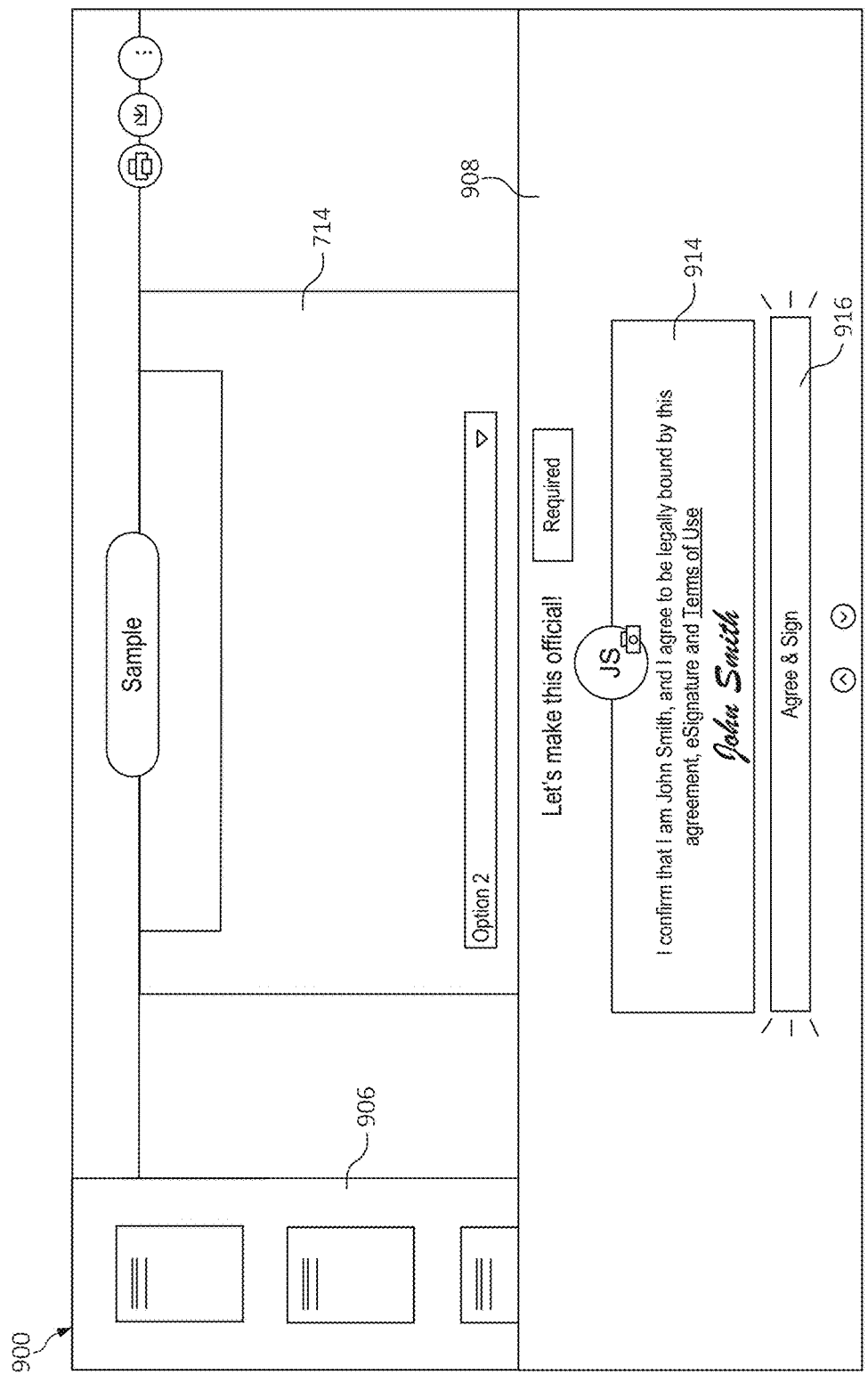
Figure 10:
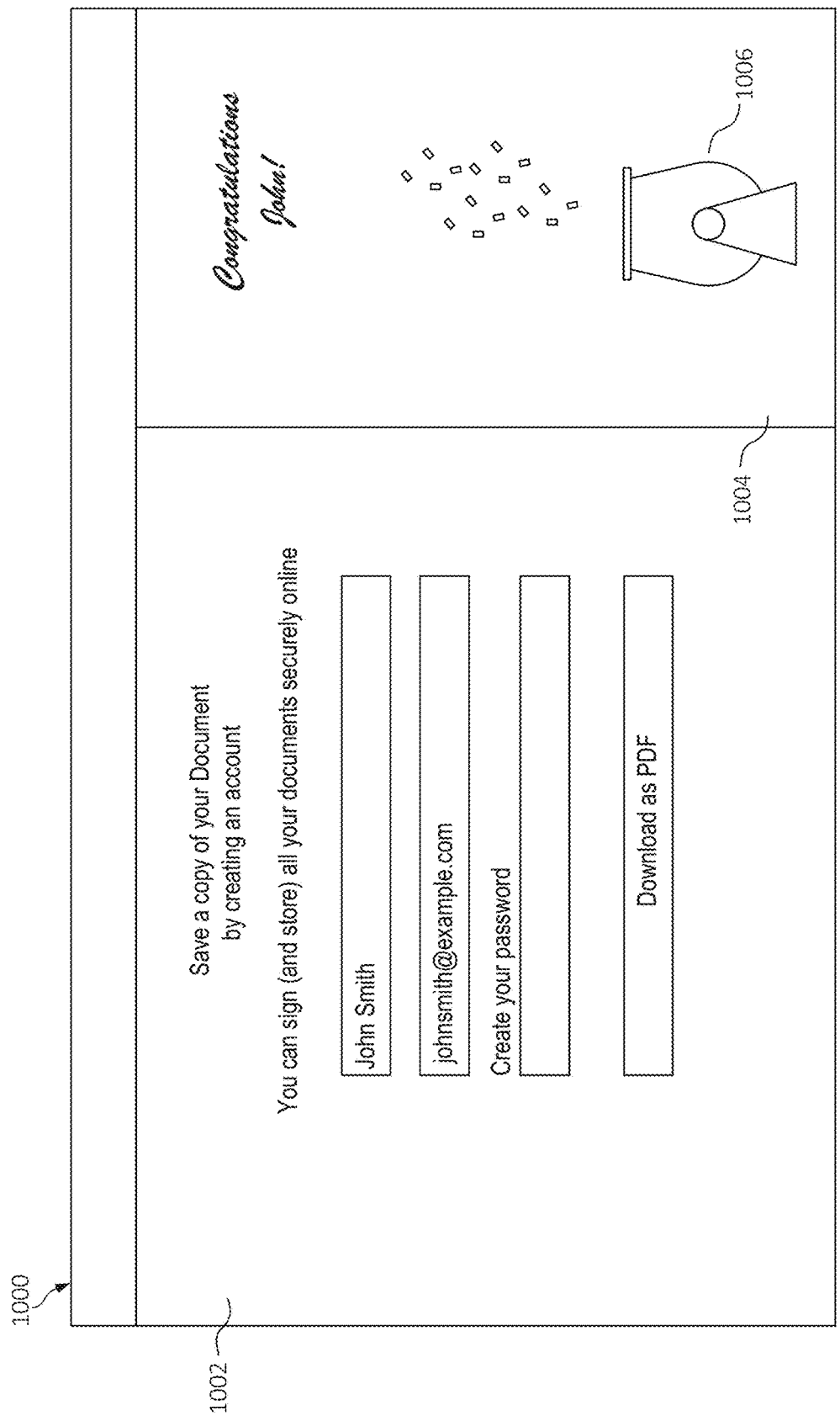
FIG. 10 is an illustration of an example user interface at a conclusion of the electronic signing session, according to one or more implementations.

Referring now to FIG. 6, a flow diagram of a computer-implemented method 600 for embedding personalized media into the electronic signing session in the electronic signature service is depicted. As illustrated, the steps of the computer-implemented method 600 are executed in accordance with the computing environment of FIG. 1, with references to the relationships of the process flow (i.e., of each of the method steps) utilizing the reference numbers identified on corresponding blocks of functionality illustrated in the interfaces depicted in FIGS. 7A-10.

The computer-implemented method 600 begins (step 602) with the document sender, operating on client device 103$a$, creating a signing package and uploading the electronic document 714 to, or selecting a pre-existing document template from, the electronic signature service (step 604). The document sender then selects an option on the interface 700 (e.g., button 706) to record, upload, or point to a destination of media, such as a video, to be associated with the signing package (step 606). This media can include custom recorded videos using the camera of peripheral devices 106, uploaded files, or videos hosted at external URLs.

In the event the document sender chooses to record the media utilizing the camera of peripheral devices 106, the document sender may be prompted with a security prompt to allow the electronic signature service to capture a stream of webcam images, while the electronic signature service authenticates the call. Here, MediaRecorder of Javascript React, invoked by the electronic signature service module 150, may be implemented to pull a stream of media (video) data (blobs) from the camera, or in another example, a vp8 codec may be utilized. Once the document sender stops the stream, the media data is stored locally to the electronic signature service (e.g. in persistent storage 113). The media data is then concatenated and turned into a local URL that can be loaded by Javascript's video player to show an instant preview of the media.

The electronic signature service module 150 may then convert the first frame of the media data into a local image URL to depict a thumbnail of the document sender's video. A duration of the video is obtained, and the media is then normalized and converted into a lightweight format, such as Moving Pictures Experts Group-4 (MP4), e.g., utilizing the open-source software product FFMPEG, which ensures compatibility across various devices and reduces the file size for efficient storage and playback. Further, FFMPEG and other libraries (e.g., IMAGEMAGICK) may be used to create a plurality of static frame images from the media, and compose these static frame images into an animated GIF image. Processing of multiple videos by the electronic signature service is handled in a First In First Out (FIFO) queue (step 610).

Upload of the media may include confirming, by the electronic signature service module, the presence of the media and its data validity, while media hosted at external URLs may be validated and downloaded to a temporary location with the service.

It should be noted that if the user stops the media stream (or deletes the video within the interface 700), the video is not stored by the electronic signature service nor is any data associated therewith utilized to train any other process of the system.

The converted media is stored in the electronic signature service database (step 612), and the media is logically attached to the corresponding document sender, signing package, or document signer based on contextual data, such as whether the media serves as a welcome or exit sequence for the signer (step 614).

Next, the system logic embeds the media into the signing package at predetermined times according to the package's characteristics. For example, the document sender may set a welcome video which plays at the beginning of the document signer's electronic signing session, an exit video which plays at the conclusion of the signing session, and/or videos that play (or auto-play) at any point during the signing session. As part of the conversational options, the document sender may specify the media to be displayed when particular sections or interactive fields of the document appear. For instance, when a specific interactive field is queued for input, such as an approval field, the media may provide an explanation to the document signer, guiding them through the action required (step 618). This ability to insert media at precise moments within the signing session can be particularly useful in guiding document signers through complex agreements or negotiations, ensuring clarity and reducing errors.

In some embodiments, document signers may be able to record and/or insert media of their own into the electronic document 714, such as in proximity to a specific clause or interactive field. For instance, in a negotiation (or simply during the signing of an agreement), the system may enable the document signer to insert an audio and/or video recording of themselves querying the document sender with respect to the particular provision. This information may be transmitted back to the document sender for further clarification to the document signer, or revision, to create a dynamically "conversational" signing experience.

The electronic signature service then generates an email 800 from a predefined template, which is created and transmitted to the document signer(s) to invite the document signer(s) to participate in the electronic signing session. The animated GIF (804), created from the media, is embedded into the email with a link 806 to initiate the session, such that the animated GIF loops a short sequence of the static frame images to provide a welcome experience to each (specific) document signer(s). The email 800 is sent to the document signer via WAN 102, prompting them to initiate the signing session (step 620).

The document signer, using client device 103b, receives the email 800 and clicks the embedded link 806 containing the animated GIF 804, which directs them to the signing session hosted by the electronic signature service module 150 on computer 101 (step 622). The signing session then proceeds, with the document signer interacting with the electronic document 714 and viewing the media content at the predefined specified times during the session (step 624).

After the document signer completes input of all required interactive fields and executes the electronic document 714, the session concludes with an exit interface 1000, having interactive fields for the document signer to, for example, download the certificated document and/or create an account with the electronic signature service for enabling retrieving of the certificated document at a later time. The certificated document may also be transmitted to the document signer via email (e.g., at the address the invitation to the electronic signing session was provided).

The exit interface 1000 may further a gamification experience 1004. This gamification experience may include, for example, an animated confetti cannon 1006, which serves as a celebration module to reward the document signer for completing the signing process (step 626). This celebration module is designed as a form of positive reinforcement to encourage repeat interactions with the electronic document signing service and/or the document sender. The gamification experience 1004 may be interactive, semi-interactive and/or non-interactive. For instance, the animated confetti cannon 1006 may automatically discharge confetti, or a prompt may be displayed to encourage the document signer to initiate the cannon discharge.

In other examples, the gamification experience 1004 may include simply a display of animated letters or words in a stylized font (e.g., "Thank You!"). The gamification experience 1004 may include photos, videos, or any such alternative display to the document signer, as configured by the document sender. In some implementations (e.g., at the request of the document sender), no gamification experience 1004 is presented. In other implementations, the gamification experience 1004 is presented to a first document signer of the electronic document 714 and not presented to a second document signer of the electronic document 714. The computer-implemented method 600 ends (step 628).

Proposals and Financial Documents

Embedding personalized media may additionally benefit document signers (i.e., recipients) when the electronic document 714 comprises a proposal, estimate, or other financial document such as an invoice. Adding personalized media in relation to these types of documents may aid in guiding document signers through understanding the various charges and components within the electronic document 714. For instance, a document sender (such as a business or service provider) could embed a short video or audio clip explaining the breakdown of specific charges therein. This media could help clarify potentially complex or unfamiliar charges, thus reducing confusion and enhancing the transparency of the proposal or billing process. For example, a video may be embedded to be displayed as the document signer reviews certain line items, offering a visual explanation of how particular fees were calculated or why certain charges were applied.

This approach may also help alleviate any misunderstandings or disputes that may arise as part of an agreement subject to the electronic document 714, as the embedded media could serve as a real-time tutorial, walking the document signer through the electronic document 714 step-by-step. If the document pertains to a subscription service or a recurring charge, for example, a personalized video may be attached to explain the ongoing billing terms, ensuring that document signers fully understand the costs before they proceed to sign. This can be especially beneficial during negotiations, where the video could clarify key terms and conditions, reducing potential areas of disagreement.

Moreover, embedding personalized media into electronic signing sessions may provide a tool for upselling or cross-selling, where at the end of the signing session, a brief promotional video introduces additional services or products related to the one being proposed or invoiced.

Additionally, by embedding the media, the document signer can be prompted with more in-depth explanations or tips when reviewing certain parts of the electronic document 714. For example, when a tax charge or discount is applied, the media may play comprising an explanation of the applicable tax laws or how the discount was applied to the total amount, and the media could also be updated or replaced during document revisions to reflect any negotiated changes or updated terms. This flexibility allows media to remain relevant throughout the lifecycle of document negotiation and execution.

Security

It should be noted that electronic document signature service employs robust security measures to protect data associated with users and the electronic document 714 during transmission and processing. All requests are handled using Transport Layer Security (TLS) encryption, ensuring that only secure Hypertext Transfer Protocol Secure (HTTPS) connections are honored. A unique security layer involves asymmetric encrypted communications between the front-end and the system's API, preventing the transmission of sensitive data, such as passwords, in plain text. The backend is managed by Laravel PHP (Hypertext Preprocessor), which handles endpoints, routes, and methods through specific routing documents.

Middleware facilitates securing of the application by throttling incoming requests based on exposure and endpoint purpose, encrypting sensitive payloads, and authenticating requests through scope inspection. Authenticated users are assigned tokens with defined scopes that determine their access permissions, and each request is verified to ensure the correct scope is present. After middleware processing, requests undergo strict validation to confirm user access to requested resources, with all incoming data being sanitized and normalized.

Core functionality is structured according to the Model-View-Controller (MVC) architecture, with logic housed in controllers that direct operations to underlying services as needed. Data models represent key objects, interfacing real data with the database, managing editable fields, typecasting properties, and defining relationships between models. Responses are returned in JavaScript Object Notation (JSON) format with appropriate HTTP status codes. In case of errors, only minimal information is provided, shielding the user from raw error data.

The electronic signature service further implements secure OAuth 2.0 (Open Authorization) protocols, vetting clients internally and limiting their access to specific API endpoints. Responses to third-party clients are minimal, offering only the necessary data to maintain security. The implementation is further enhanced by enforcing Proof Key for Code Exchange (PKCE) and defining scopes that control data access based on client permissions. Authorization codes used in OAuth are highly randomized, stored temporarily in a secure, hashed format, and designed to expire after five minutes or as soon as they are used, adding an extra layer of security.

Access tokens issued expire after 15 days, and each request verifies the validity of the token to prevent unauthorized access. Expired tokens are routinely purged from the electronic signature service's database, and refresh tokens are available with a 30-day expiration, augmented with custom validation checks to further secure the service.

Machine Learning and Cognitive Analyses

In some embodiments, at least some of the functionality described herein (e.g., generating sender/signer models) may be performed utilizing a cognitive analysis. The cognitive analysis may include classifying natural language, analyzing tone, and analyzing sentiment with respect to, for example, information associated with a particular product, platform, and/or service (e.g., the electronic signature service), content and communications sent to and/or received by users, and/or other available data sources. In some embodiments, natural language processing (NLP), natural language understanding (NLU), and/or natural language generation (NLG) may be used to conduct research (e.g., determine a nature of interactions of workflows between a user/application and the particular product, platform, and/or service), determine working parameters, identify patterns (e.g., usage patterns), perform usage simulations, output recommendations to a user, and the like.

In some implementations, the cognitive analysis may include analyses on additional data which is not text-based. For example, Mel-frequency cepstral coefficients (MFCCs) (e.g., for audio content), and/or region-based convolutional neural network (R-CNN) pixel mapping (e.g., for images/videos), as are commonly understood, are used. As such, it should be understood that the methods/systems described herein may be applied to content other than text-based (or alphanumeric) content but also audio content and/or images/videos (e.g., an event associated with an entity is referenced in an audio and/or video file).

The processes described herein may utilize various information or data sources associated with users (i.e., a document sender and/or a document signer using the electronic signature service) and/or the product, platform, service, and/or workflow. With respect to users, the data sources may include, for example, any available data sources associated with the user. For example, in some embodiments, a profile (e.g., a cognitive profile) for the user(s) may be generated. Data sources that may be use used to generate a cognitive profile for the user(s) may include any appropriate data sources associated with the user that are accessible by the system (with the permission or authorization of the user). Examples of such data sources include, but are not limited to, communication sessions and/or the content (or communications) thereof (e.g., phone calls, video calls, text messaging, emails, in person/face-to-face conversations, etc.), a profile of (or basic information about) the user (e.g., job title, place of work, length of time at current position, family role, etc.), a schedule or calendar (i.e., the items listed thereon, time frames, etc.), projects (e.g., past, current, or future work-related projects), location (e.g., previous and/or current location and/or location relative to other users), social media activity (e.g., posts, reactions, comments, groups, etc.), browsing history (e.g., web pages visited), and online purchases.

As such, in some embodiments, the methods and/or systems described herein may utilize a "cognitive analysis," "cognitive system," "machine learning," "cognitive modeling," "predictive analytics," and/or "data analytics," as is commonly understood by one skilled in the art. Generally, these processes may include, for example, executing machine learning logic or program code to receive and/or retrieve multiple sets of inputs, and the associated outputs, of one or more systems and processing the data (e.g., using a computing system and/or processor) to generate or extract models, rules, etc. that correspond to, govern, and/or estimate the operation of the system(s), or with respect to the embodiments described herein, models which optimize the interaction between user(s) and the electronic signature service, as described herein. Utilizing the models, the performance (or operation) of the system (e.g., utilizing/based on new inputs) may be predicted and/or the performance of the system may be optimized by investigating how changes in the input(s) effect the output(s). Feedback received from (or provided by) users and/or administrators may also be utilized, which may allow for the performance of the system to further improve with continued use.

In certain embodiments, the cognitive analyses described herein may apply one or more heuristics and machine learning based models using a wide variety of combinations of methods, such as supervised learning, unsupervised learning, temporal difference learning, reinforcement learning and so forth. Some non-limiting examples of supervised learning which may be used with the present technology include averaged one-dependence estimators (AODE), artificial neural network, backpropagation, Bayesian statistics, naive bays classifier, Bayesian network, Bayesian knowledge base, case-based reasoning, decision trees, inductive logic programming, Gaussian process regression, gene expression programming, group method of data handling (GMDH), learning automata, learning vector quantization, minimum message length (decision trees, decision graphs, etc.), lazy learning, instance-based learning, nearest neighbor algorithm, analogical modeling, probably approximately correct (PAC) learning, ripple down rules, a knowledge acquisition methodology, symbolic machine learning algorithms, sub symbolic machine learning algorithms, support vector machines, random forests, ensembles of classifiers, bootstrap aggregating (bagging), boosting (meta-algorithm), ordinal classification, regression analysis, information fuzzy networks (IFN), statistical classification, linear classifiers, fisher's linear discriminant, logistic regression, perceptron, support vector machines, quadratic classifiers, k-nearest neighbor, hidden Markov models and boosting. Some non-limiting examples of unsupervised learning which may be used with the present technology include artificial neural network, data clustering, expectation-maximization, self-organizing map, radial basis function network, vector quantization, generative topographic map, information bottleneck method, distributed autonomous entity systems based interaction (IBSEAD), association rule learning, apriori algorithm, Equivalence Class Clustering and bottom-up Lattice Traversal (ECLAT) algorithm, Frequent Pattern (FP)-growth algorithm, hierarchical clustering, single-linkage clustering, conceptual clustering, partitional clustering, k-means algorithm, fuzzy clustering, and reinforcement learning. Some non-limiting examples of temporal difference learning may include Quality (Q)-learning and learning automata. Specific details regarding any of the examples of supervised, unsupervised, temporal difference or other machine learning described in this paragraph are known and are considered to be within the scope of this disclosure.

In some implementations, machine learning algorithms may analyze user interactions with components of the electronic signature service (e.g., the custom React Javascript components) such as the drag-and-drop system, field resizer, and zoom/pan features on mobile devices. Document sender/signer patterns and behaviors may then be modeled to infer their most likely actions or preferences, and dynamically adjust the interface or suggest interactive fields or document layouts. In one example, the service may use historical data to automate or suggest branding elements in the custom branding customizer, tailoring the experience to match user or company profiles.

In some implementations, machine learning may be employed to bolster existing security measures. Anomaly detection systems may be developed to monitor access patterns, login behaviors, and data transmission, particularly for the asymmetrically encrypted communications. These models may learn what constitutes normal behavior, thereby identifying potential security threats or breaches in real-time, adapting the security protocols dynamically based on perceived risk levels.

Machine learning may further streamline the video recording and GIF creation processes by using NLP for speech-to-text may facilitate automated subtitling or content tagging for personalized videos. Moreover, machine vision may analyze video content to automatically suggest or create relevant GIF loops, enhancing the engagement of email invitations without manual intervention.

Generated models may further provide businesses with insights into engagement patterns. For example, the confetti cannon 1006 and other celebratory animations may employ machine learning to customize the celebration based on user achievements or preferences, learned over time. For example, if certain animations or games lead to higher user satisfaction or return rates, the system may prioritize these, making the celebratory experience more engaging and personalized.

It should be noted that, as used herein, the terms "an embodiment", "embodiment", "embodiments", "the embodiment", "the embodiments", "one or more embodiments", "some embodiments", and "one embodiment" mean "one or more (but not all) embodiments of the present invention(s)" unless expressly specified otherwise.

The terms "including", "comprising", "having" and variations thereof mean "including but not limited to", unless expressly specified otherwise.

The enumerated listing of items does not imply that any or all of the items are mutually exclusive, unless expressly specified otherwise.

The terms "a", "an" and "the" mean "one or more", unless expressly specified otherwise.

Devices that are in communication with each other need not be in continuous communication with each other, unless expressly specified otherwise. In addition, devices that are in communication with each other may communicate directly or indirectly through one or more intermediaries.

A description of an embodiment with several components in communication with each other does not imply that all such components are required. On the contrary, a variety of optional components are described to illustrate the wide variety of possible embodiments of the present invention.

When a single device or article is described herein, it will be readily apparent that more than one device/article (whether or not they cooperate) may be used in place of a single device/article. Similarly, where more than one device or article is described herein (whether or not they cooperate), it will be readily apparent that a single device/article may be used in place of the more than one device or article or a different number of devices/articles may be used instead of the shown number of devices or programs. The functionality and/or the features of a device may be alternatively embodied by one or more other devices which are not explicitly described as having such functionality/features. Thus, other embodiments of the present invention need not include the device itself.

The foregoing description of various embodiments of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto. The above specification, examples and data provide a complete description of the manufacture and use of the composition of the invention. Since many embodiments of the invention can be made without departing from the spirit and scope of the invention, the invention resides in the claims herein after appended.

What is claimed is:

1. A computer-implemented method for embedding personalized media into an electronic signing session in an electronic signature service, comprising:

generating, by one or more processors executing the electronic signature service, a signing package initiated by a document sender;

receiving into the signing package from the document sender, by the one or more processors, an electronic document to be electronically endorsed or executed by a document recipient;

receiving into the signing package from the document sender, by the one or more processors, one or more pre-recorded media portions associated with the electronic document;

embedding, by the one or more processors, the one or more pre-recorded media portions into the signing package to be displayed to the document recipient during the electronic signing session of the electronic document, wherein the electronic signing session is configured to proceed exclusively with the document recipient, and wherein the embedded one or more pre-recorded media portions are customized by the document sender to provide the document recipient instruction or explanation specific to the electronic document during the electronic signing session occurring in absence of the document sender; and displaying, by the one or more processors, the one or more pre-recorded media portions to the document signer in the electronic signing session, wherein at least one of the pre-recorded media portions is displayed to the document recipient prior to the document recipient electronically endorsing or executing the electronic document.

2. The computer-implemented method of claim 1, wherein each of the one or more pre-recorded media portions respectively comprise at least one of:
   a video recorded via the electronic signature service by the document sender at a time commensurate with uploading the electronic document to the electronic signature service;
   a pre-recorded video uploaded by the document sender to the electronic signature service; and
   a web-hosted video stored remotely to each of the document sender and the electronic signature service.

3. The computer-implemented method of claim 1, further comprising:
   authenticating the document sender by the electronic signature service prior to the receiving of the one or more pre-recorded media portions;
   analyzing and processing the one or more pre-recorded media portions to conform with predetermined requirements upon being received by the electronic signature service; and
   at least temporarily storing the one or more pre-recorded media portions on a database by the electronic signature service.

4. The computer-implemented method of claim 1, wherein the one or more pre-recorded media portions comprise a plurality of media portions, and wherein:
   a first one of the plurality of media portions is displayed to the document recipient at a first time respective to the electronic signing session, and
   a second one of the plurality of media portions is displayed to the document recipient at a second time respective to the electronic signing session.

5. The computer-implemented method of claim 1, wherein the one or more pre-recorded media portions comprise a plurality of media portions, and further comprising an additional document recipient electronically endorsing or executing the electronic document in an additional electronic signing session, wherein:
   a first one of the plurality of media portions is displayed to the document recipient during the electronic signing session of the electronic document, and
   a second one of the plurality of media portions is displayed to the additional document recipient during the additional electronic signing session of the electronic document.

6. The computer-implemented method of claim 1, wherein the displaying of the one or more pre-recorded media portions further comprises selectively displaying the one or more media pre-recorded portions to the document recipient according to predetermined criteria.

7. The computer-implemented method of claim 1, further comprising:
   generating an animated Graphics Interchange Format (GIF) image using a plurality of static frame images from the one or more pre-recorded media portions; and
   embedding the animated GIF image into an email template transmitted from the electronic signature service to the document recipient inviting the document recipient to participate in the electronic document signing session.

8. A system for embedding personalized media into an electronic signing session in an electronic signature service, comprising:
   one or more processors executing the electronic signature service; and
   one or more memory storing instructions executed by the one or more processors, the instructions, when executed, causing the one or more processors to:
   generate a signing package initiated by a document sender;
   receive, into the signing package from the document sender, an electronic document to be electronically endorsed or executed by a document recipient;
   receive, into the signing package from the document sender, one or more pre-recorded media portions associated with the electronic document;
   embed the one or more pre-recorded media portions into the signing package to be displayed to the document recipient during the electronic signing session of the electronic document, wherein the electronic signing session is configured to proceed exclusively with the document recipient, and wherein the embedded one or more pre-recorded media portions are customized by the document sender to provide the document recipient instruction or explanation specific to the electronic document during the electronic signing session occurring in absence of the document sender; and
   display the one or more pre-recorded media portions to the document signer in the electronic signing session, wherein at least one of the pre-recorded media portions is displayed to the document recipient prior to the document recipient electronically endorsing or executing the electronic document.

9. The system of claim 8, wherein each of the one or more pre-recorded media portions respectively comprise at least one of:
   a video recorded by the document sender via the electronic signature service at a time commensurate with uploading the electronic document to the electronic signature service;
   a pre-recorded video uploaded by the document sender to the electronic signature service; and
   a web-hosted video stored remotely to each of the document sender and the electronic signature service.

10. The system of claim 8, wherein, when executed, the executable instructions further cause the one or more processors to:
   authenticate the document sender by the electronic signature service prior to the receiving of the one or more pre-recorded media portions;
   analyze and process the one or more pre-recorded media portions to conform with predetermined requirements upon being received by the electronic signature service; and
   at least temporarily store the one or more pre-recorded media portions on a database by the electronic signature service.

11. The system of claim 8, wherein the one or more pre-recorded media portions comprise a plurality of media portions, and wherein:

a first one of the plurality of media portions is displayed to the document recipient at a first time respective to the electronic signing session, and a second one of the plurality of media portions is displayed to the document recipient at a second time respective to the electronic signing session.

12. The system of claim 8, wherein the one or more pre-recorded media portions comprise a plurality of media portions, and further comprising an additional document recipient electronically endorsing or executing the electronic document in an additional electronic signing session, wherein:

a first one of the plurality of media portions is displayed to the document recipient during the electronic signing session of the electronic document, and a second one of the plurality of media portions is displayed to the additional document recipient during the additional electronic signing session of the electronic document.

13. The system of claim 8, wherein, when executed, the executable instructions further cause the one or more processors to:

generate an animated Graphics Interchange Format (GIF) image using a plurality of static frame images from the one or more pre-recorded media portions; and embed the animated GIF image into an email template transmitted from the electronic signature service to the document recipient inviting the document recipient to participate in the electronic document signing session.

14. The system of claim 8, wherein the displaying of the one or more pre-recorded media portions further comprises selectively displaying the one or more pre-recorded media portions to the document recipient according to predetermined criteria.

15. A computer program product for embedding personalized media into an electronic signing session in an electronic signature service, the computer program product comprising:

one or more non-transitory computer readable storage media, and program instructions collectively stored on the one or more non-transitory computer readable storage media, the program instructions comprising:

program instructions to generate, by one or more processors executing the electronic signature service, a signing package initiated by a document sender;

program instructions to receive into the signing package from the document sender, by the one or more processors, an electronic document to be electronically endorsed or executed by a document recipient;

program instructions to receive into the signing package from the document sender, by the one or more processors, one or more pre-recorded media portions associated with the electronic document;

program instructions to embed, by the one or more processors, the one or more pre-recorded media portions into the signing package to be displayed to the document recipient during the electronic signing session of the electronic document, wherein the electronic signing session is configured to proceed exclusively with the document recipient, and wherein the embedded one or more pre-recorded media portions are customized by the document sender to provide the document recipient instruction or explanation specific to the electronic document during the electronic signing session occurring in absence of the document sender; and program instructions to display, by the one or more processors, the one or more pre-recorded media portions to the document signer in the electronic signing session, wherein at least one of the pre-recorded media portions is displayed to the document recipient prior to the document recipient electronically endorsing or executing the electronic document.

16. The computer program product of claim 15, wherein each of the one or more pre-recorded media portions respectively comprise at least one of:

a video recorded by the document sender via the electronic signature service at a time commensurate with uploading the electronic document to the electronic signature service;

a pre-recorded video uploaded by the document sender to the electronic signature service; and a web-hosted video stored remotely to each of the document sender and the electronic signature service.

17. The computer program product of claim 15, further including program instructions to:

authenticate the document sender by the electronic signature service prior to the receiving of the one or more pre-recorded media portions;

analyze and process the one or more pre-recorded media portions to conform with predetermined requirements upon being received by the electronic signature service; and at least temporarily store the one or more pre-recorded media portions on a database by the electronic signature service.

18. The computer program product of claim 15, wherein the one or more pre-recorded media portions comprise a plurality of media portions, and wherein:

a first one of the plurality of media portions is displayed to the document recipient at a first time respective to the electronic signing session, and a second one of the plurality of media portions is displayed to the document recipient at a second time respective to the electronic signing session.

19. The computer program product of claim 15, wherein the one or more pre-recorded media portions comprise a plurality of media portions, and further comprising an additional document recipient electronically endorsing or executing the electronic document in an additional electronic signing session, wherein:

a first one of the plurality of media portions is displayed to the document recipient during the electronic signing session of the electronic document, and a second one of the plurality of media portions is displayed to the additional document recipient during the additional electronic signing session of the electronic document.

20. The computer program product of claim 15, further including program instructions to:

generate an animated Graphics Interchange Format (GIF) image using a plurality of static frame images from the one or more pre-recorded media portions; and embed the animated GIF image into an email template transmitted from the electronic signature service to the document recipient inviting the document recipient to participate in the electronic document signing session.

* * * * *